United States Patent
Watanabe

(10) Patent No.: US 10,996,904 B2
(45) Date of Patent: May 4, 2021

(54) NETWORK CONTROL DEVICE, IMAGE FORMING APPARATUS, CONTROL METHOD OF NETWORK CONTROL DEVICE, AND NON-TRANSITORY RECORDING MEDIUM

(71) Applicant: Yuuto Watanabe, Kanagawa (JP)

(72) Inventor: Yuuto Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/929,132

(22) Filed: Jul. 15, 2020

(65) Prior Publication Data
US 2021/0034308 A1    Feb. 4, 2021

(30) Foreign Application Priority Data

Aug. 1, 2019    (JP) .............................. JP2019-142512

(51) Int. Cl.
*G06F 3/12*     (2006.01)
*H04N 1/00*     (2006.01)

(52) U.S. Cl.
CPC ....... *G06F 3/1221* (2013.01); *H04N 1/00214* (2013.01); *H04N 1/00891* (2013.01)

(58) Field of Classification Search
CPC .............. G06F 3/1221; H04N 1/00214; H04N 1/00891
USPC ...................................................... 358/1.15
See application file for complete search history.

(56) References Cited

U.S. PATENT DOCUMENTS

| | | | |
|---|---|---|---|
| 2006/0274368 A1* | 12/2006 | Imine ................. | H04N 1/00896 358/1.15 |
| 2008/0195688 A1 | 8/2008 | Watanabe | |
| 2010/0246380 A1* | 9/2010 | Bando ................... | G06F 1/3203 370/216 |
| 2014/0368862 A1* | 12/2014 | Ooba ................. | H04N 1/00204 358/1.14 |
| 2015/0338895 A1* | 11/2015 | Koga .................... | G06F 1/3284 713/320 |
| 2017/0187916 A1 | 6/2017 | Ohta et al. | |
| 2017/0187917 A1 | 6/2017 | Tanaka et al. | |
| 2017/0195518 A1 | 7/2017 | Watanabe et al. | |
| 2019/0387124 A1 | 12/2019 | Watanabe | |

FOREIGN PATENT DOCUMENTS

JP    2009-029102    2/2009
JP    2012-179788    9/2012

* cited by examiner

*Primary Examiner* — Allen H Nguyen
(74) *Attorney, Agent, or Firm* — Xsensus LLP

(57) ABSTRACT

A network control device includes first and second interfaces, a first memory, a packet converter, a first data transfer section, a filter, and a packet transmission controller. The converter converts a second type of packets of a second system in the memory into a first type of packets of a first system. The filter extracts a valid first type of packets from the first type of packets read from the memory by the transfer section. In an energy saving state, the controller generates and transmits a first type of packets for transmission of the first system to the first interface when the extracted valid first type of packets are of the first type of packets, and generates and transmits a second type of packets for transmission of the second system to the second interface when the extracted valid first type of packets are of the second type of packets.

16 Claims, 16 Drawing Sheets

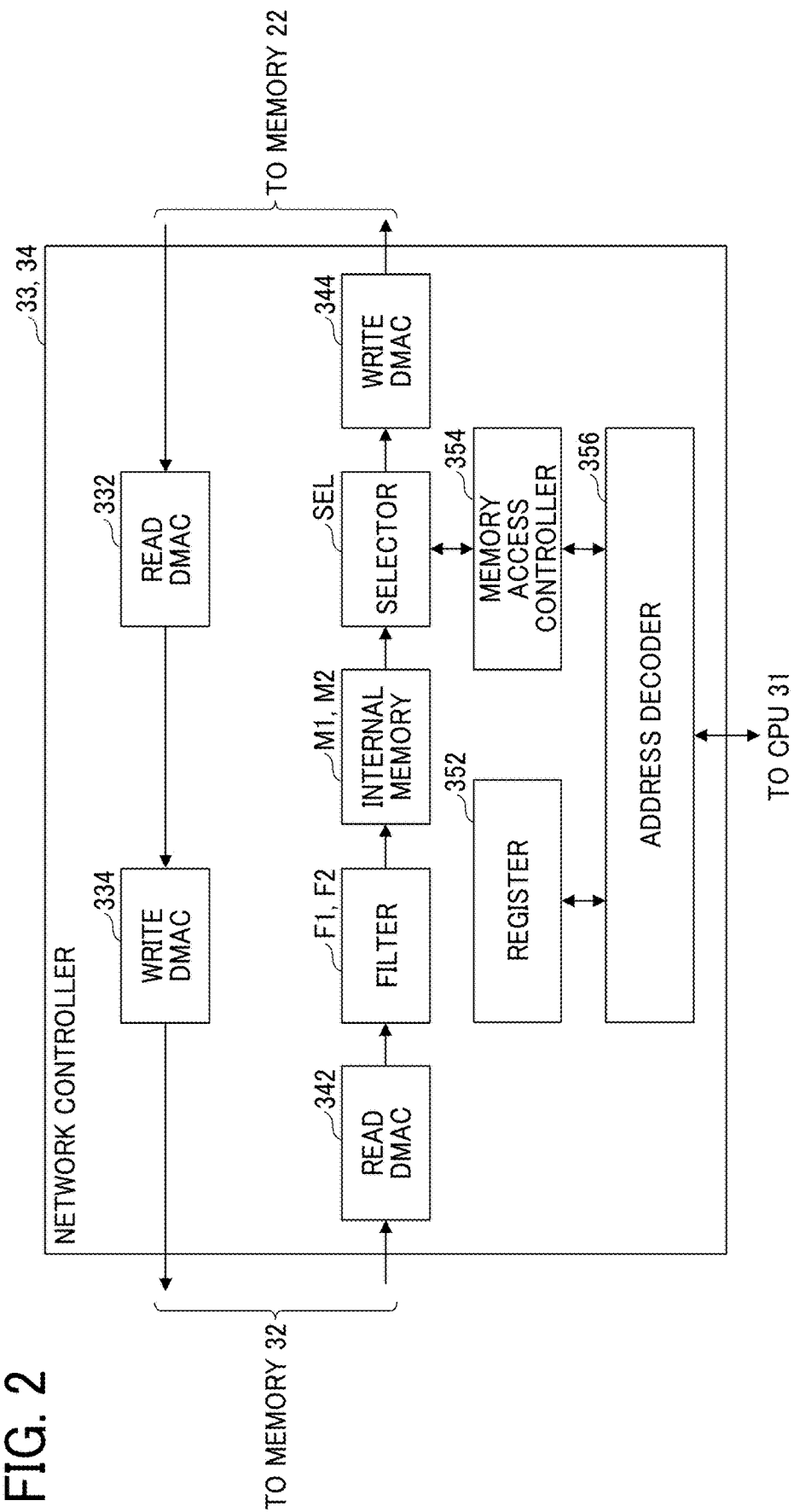

NETWORK CONTROL DEVICE, IMAGE FORMING APPARATUS, CONTROL METHOD OF NETWORK CONTROL DEVICE, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2019-142512 filed on Aug. 1, 2019 in the Japan Patent Office, the entire disclosure of which is hereby incorporated by reference herein.

BACKGROUND

Technical Field

The present invention relates to a network control device, an image forming apparatus, a control method of a network control device, and a non-transitory recording medium.

Description of the Related Art

An image forming apparatus, such as a plotter, a printer, or a scanner, with a function of connecting to a network is operable based on a packet received via the network. This type of image forming apparatus includes a filter unit that determines whether the received packet is related to an image forming operation. For example, if the filter unit determines the receipt of an address resolution protocol (ARP) request packet in an energy saving mode of the image forming apparatus, the image forming apparatus processes the packet without cancelling the energy saving mode. It is thereby possible for the image forming apparatus to transmit an ARP reply packet in the energy saving mode, reducing the power consumption of the image forming apparatus.

A typical filter unit, however, filters a packet received by a media access controller (MAC) via a wired network, for example. Therefore, the filter unit is unable to filter a packet received via a wireless network, for example, decreasing the effect of reducing the power consumption.

SUMMARY

In one embodiment of this invention, there is provided an improved network control device that is connected to an operation device and processes a plurality of packets received from outside the network control device. The operation device is settable in a regular operating state for supplying power to the operation device or an energy saving state for stopping power supply to at least a part of the operation device. The network control device includes, for example, a first communication interface, a second communication interface, a first memory, a packet converter, a first data transfer section, a filter, and a packet transmission controller. The first communication interface transmits and receives a first type of packets according to a first communication system. The second communication interface transmits and receives a second type of packets according to a second communication system different from the first communication system. The first memory stores each of the first type of packets and the second type of packets at a specified address of the first memory. The packet converter converts the second type of packets stored in the first memory into the first type of packets, and stores the converted first type of packets in the first memory. The first data transfer section reads each of the first type of packets from a specified address of the first memory. The filter extracts a valid first type of packets from the first type of packets read by the first data transfer section. When the operation device is in the energy saving state, the packet transmission controller analyzes contents of the valid first type of packets extracted by the filter. When the contents of the extracted valid first type of packets are of the first type of packets received by the first communication interface, the packet transmission controller generates a first type of packets for transmission according to the first communication system, and transmits the generated first type of packets for transmission to the first communication interface. When the contents of the extracted valid first type of packets are of the second type of packets received by the second communication interface, the packet transmission controller generates a second type of packets for transmission according to the second communication system, and transmits the generated second type of packets for transmission to the second communication interface.

In one embodiment of this invention, there is provided an improved image forming apparatus that includes, for example, the above-described network control device and the above-described operation device. The network control device is connected to the operation device. The operation device performs a process of forming an image.

In one embodiment of this invention, there is provided an improved control method of a network control device. The network control device is connected to an operation device, and includes a first communication interface, a second communication interface, and a first memory to process a plurality of packets received from outside the network control device. The operation device is settable in a regular operating state for supplying power to the operation device or an energy saving state for stopping power supply to at least a part of the operation device. The control method includes, for example; converting a second type of packets according to a second communication system each stored at a specified address of the first memory into a first type of packets according to a first communication system, and storing the converted first type of packets in the first memory; reading each of the first type of packets from a specified address of the first memory; extracting a valid first type of packets from the read first type of packets; when the operation device is in the energy saving state, analyzing contents of the extracted valid first type of packets; when the contents of the extracted valid first type of packets are of the first type of packets received by the first communication interface, generating a first type of packets for transmission according to the first communication system, and transmitting the generated first type of packets for transmission to the first communication interface; and when the contents of the extracted valid first type of packets are of the second type of packets received by the second communication interface, generating a second type of packets for transmission according to the second communication system, and transmitting the generated second type of packets for transmission to the second communication interface.

In one embodiment of this invention, there is provided a non-transitory recording medium storing a plurality of instructions which, when executed by one or more processors, cause the processors to perform the above-described control method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a block diagram illustrating an example of each of network controllers included in the image forming apparatus of the first embodiment;

FIG. 3 is a diagram illustrating an example of information set in a register of the network controller of the first embodiment;

Figure 1:
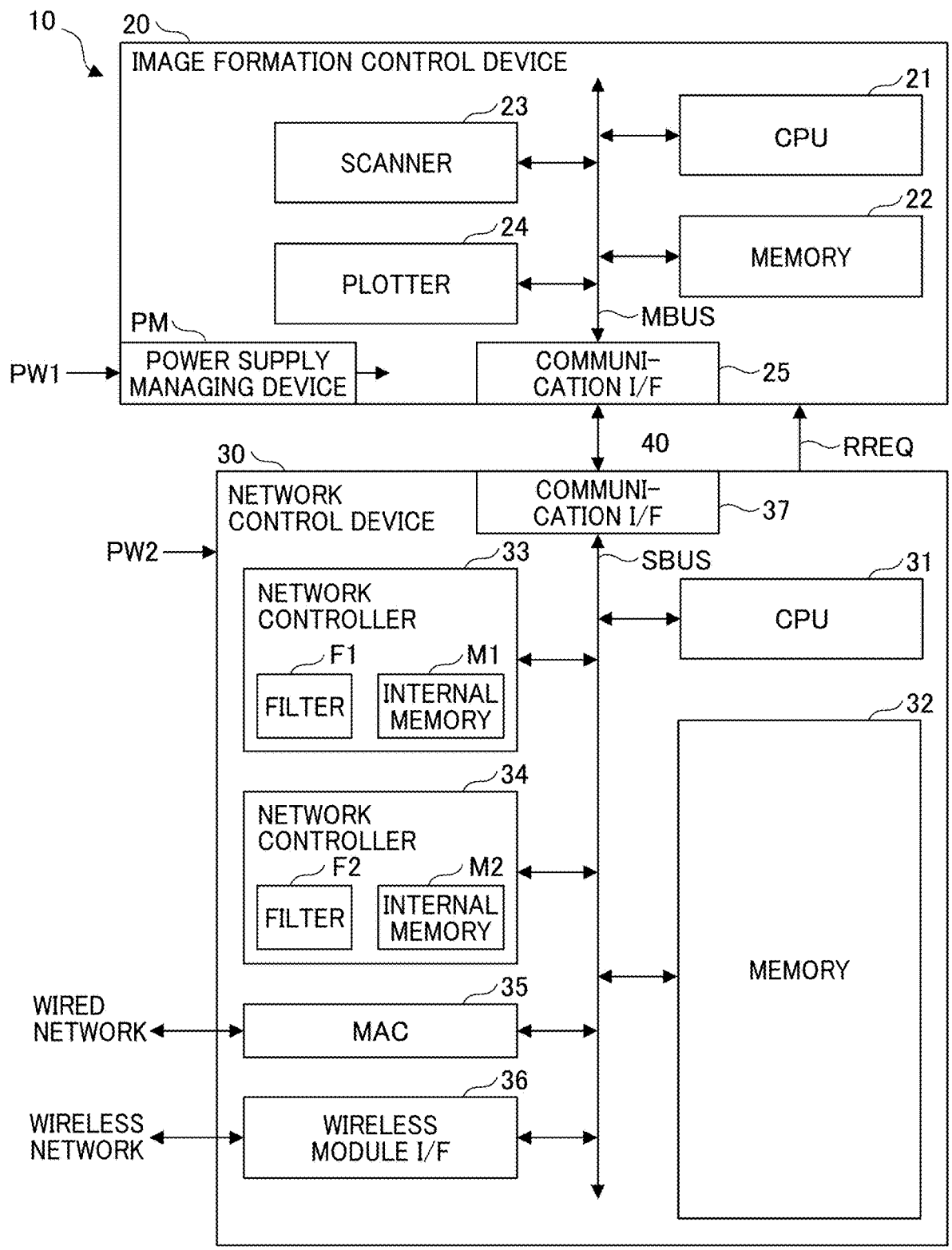
FIG. 1 is a block diagram illustrating a configuration of an image forming apparatus of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described.

FIG. 1 is a block diagram illustrating a configuration of an image forming apparatus 10 of the first embodiment of the present invention. The image forming apparatus 10 includes an image formation control device 20 that forms an image and a network control device 30 that controls transmission and reception of packets to and from a wired network and a wireless network. To facilitate understanding, the illustration of the image formation control device 20 in FIG. 1 is limited to major components of the image formation control device 20. The image formation control device 20 has an image forming function, and may also have a function other than the image forming function. The image formation control device 20 is an example of an operation device settable in a regular operating state for supplying power to the operation device or an energy saving state for stopping power supply to at least a part of the operation device.

The image formation control device 20 includes a central processing unit (CPU) 21, a memory 22, a scanner 23, a plotter 24, a communication interface (I/F) 25, and a power supply managing device PM, which are connected to each other by a bus MBUS. The memory 22 is an example of a second memory. For example, the CPU 21 executes a control program stored in the memory 22 to control the entire image formation control device 20 and control the communication of the image formation control device 20 with the network control device 30. The memory 22 stores the control program, various parameters, and image data, for example.

The scanner 23 scans a document to generate image data, and stores the generated image data in the memory 22. The plotter 24 plots the image data stored in the memory 22 on a sheet, for example. The communication I/F 25 is connected to the network control device 30 via a high-speed serial I/F 40 conforming to a standard such as peripheral component interconnect express (PCIe). The communication I/F 25 transmits and receives image data and control commands, for example, to and from the network control device 30.

When the image formation control device 20 is set in the regular operating state, the power supply managing device PM supplies power supply PW1 to all components of the image formation control device 20 in FIG. 1 from outside the image forming apparatus 10. When the image formation control device 20 is set in the energy saving state, the power supply managing device PM supplies the power supply PW1 to some electronic components and circuits of the image formation control device 20. For example, in the energy saving state, the power supply PW1 is not supplied to the CPU 21, the memory 22, the scanner 23, the plotter 24, and the communication I/F 25, but is supplied to a reception circuit of the image formation control device 20 for receiving a return request signal RREQ. In the energy saving state, in response to receipt of the return request signal RREQ, the reception circuit for receiving the return request signal RREQ requests the power supply managing device PM to supply the power supply PW1, and components such as the CPU 21 are started with the power supply PW1. Thereby, the image formation control device 20 switches from the energy saving state to the regular operating state. The return request signal RREQ is an example of a return instruction.

The network control device 30 includes a CPU 31, a memory 32, network controllers 33 and 34, a media access controller (MAC) 35, a wireless module I/F 36, and a communication I/F 37. The memory 32 is an example of a first memory.

The CPU 31, the memory 32, the network controllers 33 and 34, the MAC 35, the wireless module I/F 36, and the communication I/F 37 are connected to each other by a bus SBUS. In the following description, the term "packet" may refer not only to the entire packet including a header but also to data included in the packet (i.e., payload).

The CPU 31 executes a network control program stored in the memory 32 to control the entire network control device 30 and control the transmission and reception of packets to and from the wired network and the wireless network. In the energy saving state, the CPU 31 generates the packets to be transmitted to the wired network or the wireless network, and stores the generated packets in the memory 32.

In the energy saving state, if the data content of the packets stored in the memory 32 is related to the operation of the image formation control device 20, the CPU 31 outputs the return request signal RREQ to switch the image formation control device 20 to the regular operating state. Then, the CPU 31 transmits information representing the contents of the packets to the image formation control device 20. Further, if the packets received from the wireless network are stored in the memory 32, the CPU 31 converts the packets into the format of packets received from the wired network, and stores the converted packets in the memory 32.

The memory 32 stores the network control program, packets, image data received from the wired network or the wireless network, and image data to be transmitted to the wired network or the wireless network, for example. For example, the network controller 33 controls the transmission and reception of packets to and from the wired network, and the network controller 34 controls the transmission and reception of packets to and from the wireless network. Further, for example, the network controllers 33 and 34 have the same function, and both perform an Ethernet (registered trademark) packet reception process, as described later.

The network controller 33 includes a filter F1 and an internal memory M1. The filter F1 discards Ethernet packets unnecessary to be processed from the Ethernet packets received from the wired network. The filter F1 further extracts Ethernet packets to be processed from the Ethernet packets received from the wired network. The Ethernet packets extracted by the filter F1 are held in the internal memory M1 to be readable by the CPU 31.

The network controller 34 includes a filter F2 and an internal memory M2. The filter F2 discards Ethernet packets unnecessary to be processed from the converted Ethernet packets converted from the wireless packets received from the wireless network. The filter F2 further extracts Ethernet packets to be processed from the converted Ethernet packets converted from the wireless packets received from the wireless network. The Ethernet packets extracted by the filter F2 are held in the internal memory M2 to be readable by the CPU 31. For example, the filters F1 and F2 have the same function to filter the Ethernet packets. An example of each of the network controllers 33 and 34 is illustrated in FIG. 2.

The MAC 35 is connected to the wired network via a physical layer, for example. The MAC 35 stores the Ethernet packets received from the wired network into the memory 32 in the order of receipt of the Ethernet packets. The MAC 35 further transmits the Ethernet packets generated by the CPU 31 and stored in the memory 32 to the wired network via the physical layer. The MAC 35 is an example of a first communication interface, and the Ethernet packets transmitted or received by the MAC 35 are an example of a first type of packets according to a first communication system.

The wireless module I/F 36 stores the wireless packets received via the wireless network into the memory 32 in the order of receipt of the wireless packets. The wireless module I/F 36 further transmits the wireless packets generated by the CPU 31 and stored in the memory 32 to the wireless network via the physical layer. The wireless module I/F 36 is an example of a second communication interface, and the wireless packets transmitted or received by the wireless module I/F 36 are an example of a second type of packets according to a second communication system.

The communication I/F 37 is connected to the image formation control device 20 via the high-speed serial I/F 40. The communication I/F 37 transmits and receives image data and control commands, for example, to and from the image formation control device 20.

The image formation control device 20 and the network control device 30 operate with the power supply PW1 and power supply PW2, respectively, which are provided by different power supply systems. The image forming apparatus 10 controls the power supplies PW1 and PW2 individually. For example, when performing a scanning operation with the scanner 23 or a plotting operation with the plotter 24, the image forming apparatus 10 turns on the power supplies PW1 and PW2 to set the image formation control device 20 in the regular operating state. When not performing the scanning operation with the scanner 23 or the plotting operation with the plotter 24, the image forming apparatus 10 turns off the power supply PW1 to set the image formation control device 20 in the power saving state, and keeps the power supply PW2 in the ON state.

If there is no document scanning instruction or image plotting instruction for longer than a predetermined period of time, for example, the power supply managing device PM of the image forming apparatus 10 stops the power supply PW1 to the image formation control device 20. Thereby, the operating state of the image formation control device 20 transitions from the regular operating state to the energy saving state with less power consumption.

When the image formation control device 20 is in the power saving state, the network control device 30 controls the communication of the image forming apparatus 10 with an external apparatus via the wired network or the wireless network. In the power saving state of the image formation control device 20, the network control device 30 sets the power supply PW1 in the OFF state and keeps the power supply PW2 in the ON state, thereby controlling the communication of the image forming apparatus 10 with the external apparatus while reducing the power consumption of the image forming apparatus 10.

For example, to bring the image formation control device 20 back to the regular operating state from the power saving state, the CPU 31 of the network control device 30 outputs the return request signal RREQ to the image formation control device 20 via a dedicated return signal line.

FIG. 2 is a block diagram illustrating an example of each of the network controllers 33 and 34 in FIG. 1. The network controllers 33 and 34 are similar in configuration, and thus the following description will be limited to the configuration of the network controller 33. In the description with FIG. 2, the term "transmission" refers to the transmission of a packet to the outside of the image forming apparatus 10, and the term "reception" refers to the reception of a packet from outside the image forming apparatus 10.

The network controller 33 includes a read direct memory access controller (DMAC) 332 for transmission, a write DMAC 334 for transmission, a read DMAC 342 for reception, and a write DMAC 344 for reception. The network controller 33 further includes the filter F1 and the internal memory M1 illustrated in FIG. 1, a selector SEL, a register 352, a memory access controller 354, and an address decoder 356.

The network controller 34 has a configuration similar to that of the network controller 33 described above with FIG. 2 except that the network controller 34 includes the filter F2 and the internal memory M2 illustrated in FIG. 1 in place of the filter F1 and the internal memory M1. The function of the filter F2 is the same as that of the filter F1, and the function and the memory capacity of the internal memory M2 are the same as those of the internal memory M1. The internal memories M1 and M2 are examples of a third memory.

The read DMAC 332 for transmission reads packets (i.e., data) held in the memory 22 of the image formation control device 20 in FIG. 1 by specifying a predetermined memory area of the memory 22 as the read source address. The read DMAC 332 then transfers the packets (i.e., data) read from the memory 22 to the write DMAC 334 for transmission.

The write DMAC 334 for transmission writes the packets (i.e., data) received from the read DMAC 332 to the memory 32 of the network control device 30 by specifying a predetermined memory area of the memory 32 as the write destination address. The read DMAC 332 and the write DMAC 334 are an example of a third data transferring section. In the following description, a packet and data included in a packet will both be referred to as a packet.

The read DMAC 342 for reception reads packets held in the memory 32 of the network control device 30 by specifying a predetermined memory area of the memory 32 as the read source address. The read DMAC 342 then transfers the packets read from the memory 32 to the filter F1. The read DMAC 342 is an example of a first data transferring section.

The filter F1 executes a filtering process on the packets transferred from the read DMAC 342 to extract, from the transferred packets, valid packets to be subjected to a packet reception process. The filter F1 then stores the extracted valid packets in the internal memory M1, and discards invalid packets unnecessary to be subjected to the packet reception process. The filtering function of the filter F1 is enabled or disabled in accordance with a control value set in the register 352.

In accordance with the control value in the register 352, the selector SEL connects the internal memory M1 to the memory access controller 354 or the write DMAC 344.

The write DMAC 344 for reception reads the packets from the internal memory M1, which is connected to the write DMAC 344 via the selector SEL, by specifying a predetermined memory area of the internal memory M1 as the read source address. The write DMAC 344 then writes the packets read from the internal memory M1 to the memory 22 of the image formation control device 20 by specifying a predetermined memory area of the memory 22 as the write destination address. The write DMAC 344 is an example of a second data transferring section.

The address decoder 356 decodes an address included in an access request from the CPU 31 of the network control device 30. If the decoded address represents the address of the register 352, the address decoder 356 sets values such as an address value and a control value in the register 352 in accordance with the access request.

The address value is used as the transfer source address or the transfer destination address in the transfer of packets by the read DMAC 332, the write DMAC 334, the read DMAC 342, or the write DMAC 344, for example. Further, the control value set in the register 352 is used in enabling or disabling the filtering function of the filter F1 or switching the selector SEL, for example.

If the decoded address represents the address of a memory area in the internal memory M1, the address decoder 356 outputs the decoded address and a memory access request to the memory access controller 354. The memory access request that requests the access to the internal memory M1 is output after the selector SEL connects the internal memory M1 to the memory access controller 354 based on the control value set in the register 352.

The memory access controller 354 generates an access command for accessing the internal memory M1 based on the access request received from the CPU 31 via the address decoder 356 (i.e., the memory access request). The access command includes an access address and a read or write command, for example. Then, the memory access controller 354 outputs the access command to the internal memory M1 to write or read packets (i.e., data) to or from a predetermined memory area of the internal memory M1.

For example, the memory access controller 354 reads from the internal memory M1 the valid packets extracted through the filtering by the filter F1, as described later. The memory access controller 354 may convert the address included in the memory access request received from the CPU 31 into the access address allocated to the internal memory M1.

With the network controller 33 or 34 illustrated in FIG. 2, the packets read from the memory 32 at the time of packet reception are filtered and transferred to the memory 22 or the CPU 31. Further, at the time of transmission of packets such as response packets, the packets are transmitted from the memory 22 to the memory 32.

FIG. 3 is a diagram illustrating an example of information set in the register 352 in FIG. 2. For example, the register 352 stores a chg_dma bit for switching a transfer path of the selector SEL. For instance, the selector SEL connects the internal memory M1 to the write DMAC 344 when the logical value of the chg_dma bit is 1, and connects the internal memory M1 to the memory access controller 354 when the logical value of the chg_dma bit is 0. The attribute of the chg_dma bit is set as "RW," which indicates that information is readable and writable.

As well as the information illustrated in FIG. 3, the register 352 also stores a filter bit for enabling or disabling the filtering function of the filter F1 or F2 and a switch bit for controlling the switching of the selector SEL. Further, an area for storing information such as the transfer source address, the transfer destination address, and the transfer byte count in DMA transfer (i.e., data transfer by a DMAC) may be allocated in the register 352.

The transfer of packet data between the internal memory M1 and the write DMAC 344 in FIG. 2 takes place when the write DMAC 344 is active (i.e., capable of performing the data transferring operation). The transfer of packet data between the internal memory M1 and the memory access controller 354 takes place in response to the issuance of the memory access request by the CPU 31.

Figure 4:
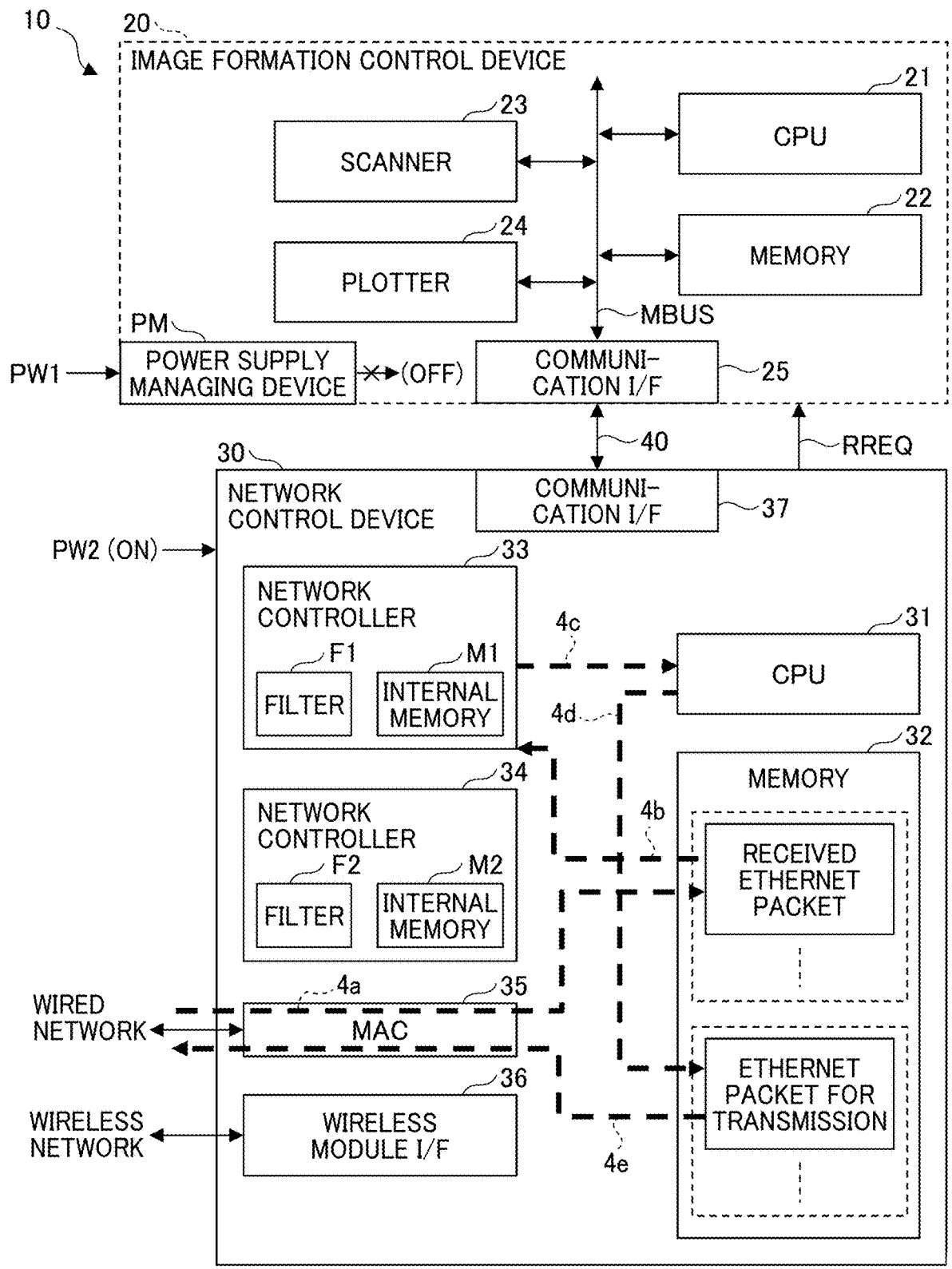
FIG. 4 is a diagram illustrating an example of an Ethernet packet reception process by the image forming apparatus of the first embodiment.

FIG. 4 is a diagram illustrating an example of an Ethernet packet reception process by the image forming apparatus 10 of the first embodiment in FIG. 1. In FIG. 4, the bus SBUS is omitted for clearer illustration. The image formation control device 20 is set in the energy saving state, and the power supply PW1 to major components of the image formation control device 20 is cut off by the power supply managing device PM (i.e., the power supply PW1 is OFF). In the energy saving state, the power supply PW2 to the network control device 30 is maintained (i.e., the power supply PW2 is ON).

In response to receipt of Ethernet packets in a packet format for the wired network, the MAC 35 of the network control device 30 stores the Ethernet packets in the memory 32 in the order of receipt of the Ethernet packets, as indicated by an arrow 4a in FIG. 4. The memory 32 includes a predetermined memory area previously allocated to hold the received Ethernet packets. The Ethernet packets are stored in the predetermined memory area in the order of receipt.

If the Ethernet packets are held in the memory 32, the read DMAC 342 of the network controller 33 in FIG. 2 reads the Ethernet packets from the memory 32 in the order of receipt of the Ethernet packets by the MAC 35, as indicated by an arrow 4b in FIG. 4. The setting of the address for operating the read DMAC 342, for example, is executed by the CPU 31. With the filter F1, the network controller 33 filters the read Ethernet packets. The network controller 33 then stores the valid Ethernet packets passed through the filter F1 in the internal memory M1.

The filter F1 discards the invalid packets unrelated to the operation of the image forming apparatus 10. Thereby, the number of packets to be processed by the CPU 31 or 21 is reduced, reducing the power consumption of the image forming apparatus 10 as compared with that in a case in which the CPU 31 or 21 processes all packets received by the MAC 35.

For example, if the CPU 31 processes all packets received by the MAC 35, and if the process of receiving all packets received by the MAC 35 is not executable by the CPU 31 alone, the image formation control device 20 may be brought back to the regular operating state to execute the packet reception process with the CPU 21 as well as with the CPU 31. Such a process, however, would increase the power consumption of the image forming apparatus 10.

The CPU 31 accesses the internal memory M1 of the network controller 33, reads the Ethernet packets stored in the internal memory M1, and analyzes the contents of the read Ethernet packets, as indicated by an arrow 4c in FIG. 4. If the analyzed contents of the Ethernet packets are unrelated to the scanning operation or the plotting operation and are processable by the network control device 30 alone, the CPU 31 generates Ethernet packets to be transmitted to the wired network (i.e., the response packets). The CPU 31 then stores the generated Ethernet packets in the memory 32, as indicated by an arrow 4d in FIG. 4.

The CPU 31 transfers, to the MAC 35, the Ethernet packets for transmission (i.e., the response packets) stored in the memory 32, as indicated by an arrow 4e in FIG. 4. As described above, if the Ethernet packets received from outside the image forming apparatus 10 are unrelated to the control of the image formation control device 20, the Ethernet packets are processed by the network control device 30, with the power supply PW1 to the image formation control device 20 being cut off. Consequently, the power consumption of the image forming apparatus 10 is reduced.

The network control device 30 may also be applied to the process of receiving packets other than the Ethernet packets and the wireless packets. For example, the network control device 30 may execute a process of receiving multiple types of packets in different formats received via the wired or wireless network.

Figure 5:
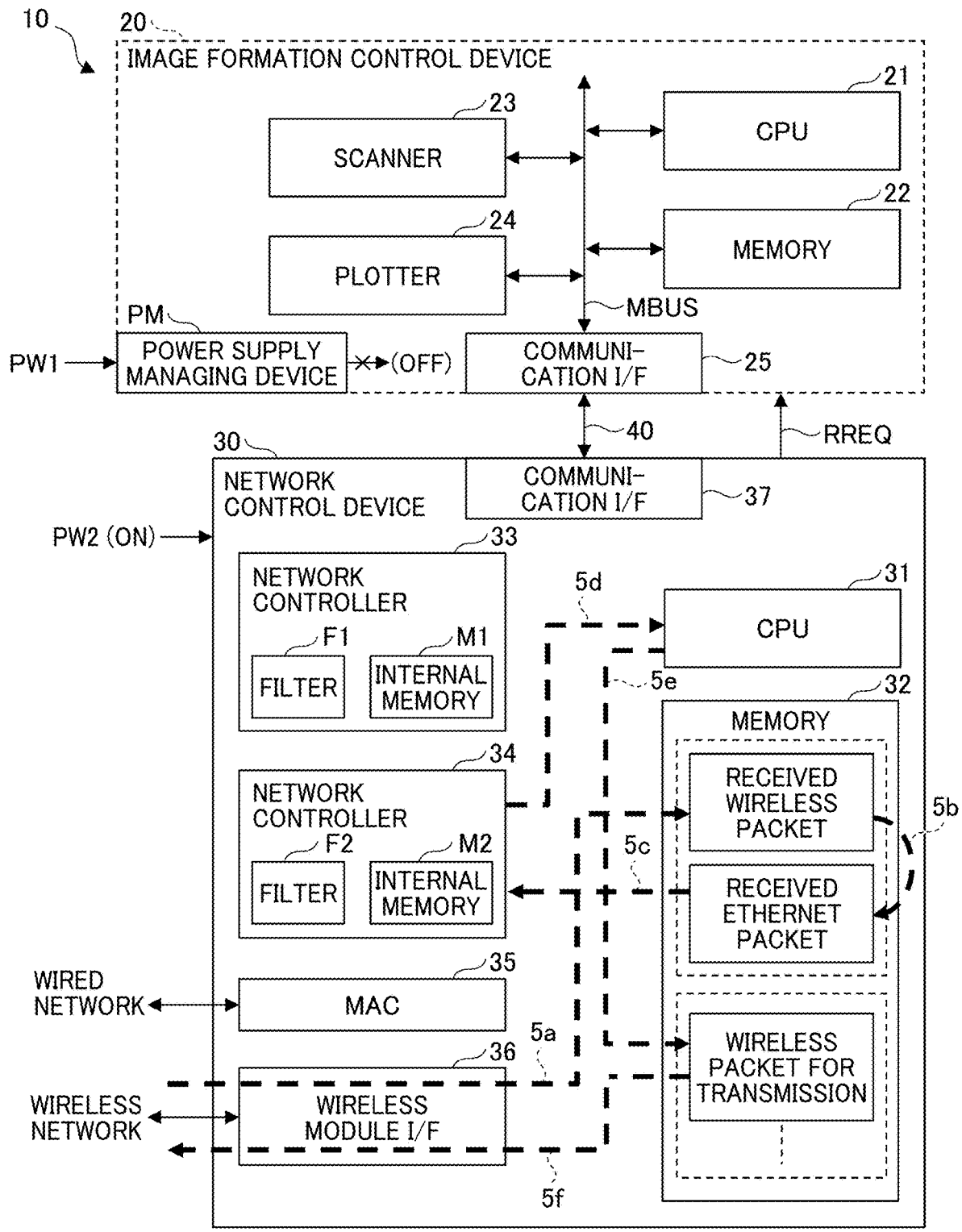
FIG. 5 is a diagram illustrating an example of a wireless packet reception process by the image forming apparatus of the first embodiment.

FIG. 5 is a diagram illustrating an example of a wireless packet reception process by the image forming apparatus 10 of the first embodiment in FIG. 1. Detailed description of parts of the process in FIG. 5 similar to those in FIG. 4 will be omitted. In FIG. 5, the bus SBUS is omitted for clearer illustration. Similarly as in the example of FIG. 4, the image formation control device 20 is set in the energy saving state, with the power supply PW1 to major components of the image formation control device 20 being cut off by the power supply managing device PM (i.e., the power supply PW1 is OFF). The power supply PW2 to the network control device 30, on the other hand, is maintained (i.e., the power supply PW2 is ON).

The wireless module I/F 36 of the network control device 30 receives the wireless packets in a packet format for the wireless network, and stores the wireless packets in the memory 32 in the order of receipt of the wireless packets, as indicated by an arrow 5a in FIG. 5. For example, the memory 32 includes a predetermined memory area previously allocated to hold the received wireless packets. The wireless packets are stored in the predetermined memory area in the order of receipt.

If the wireless packets received from outside the image forming apparatus 10 are stored in the memory 32, the CPU 31 converts the wireless packets into the Ethernet packets, as indicated by an arrow 5b in FIG. 5. The CPU 31, which converts the wireless packets into the Ethernet packets, is an example of a packet converter. In FIG. 5, the converted Ethernet packets are stored in the memory area that stores the received wireless packets, as indicated by a broken-line frame. The converted Ethernet packets, however, may be stored in a memory area different from the memory area that stores the received wireless packets (e.g., a memory area dedicated to storing the converted Ethernet packets).

In the network controller 34, the read DMAC 342 in FIG. 2 reads the converted Ethernet packets from the memory 32, and the filter F2 filters the read Ethernet packets. Then, the network controller 34 stores the valid Ethernet packets passed through the filter F2 into the internal memory M2, as indicated by an arrow 5c in FIG. 5.

The CPU 31 reads the Ethernet packets from the internal memory M2 of the network controller 34, and analyzes the contents of the read Ethernet packets, as indicated by an arrow 5d in FIG. 5. If the analyzed contents of the Ethernet packets are processable by the network control device 30 alone, the CPU 31 generates wireless packets to be transmitted to the wireless network (i.e., the response packets). The CPU 31 then stores the generated wireless packets in a predetermined memory area of the memory 32, as indicated by an arrow 5e in FIG. 5.

The CPU 31 transfers the wireless packets for transmission (i.e., the response packets) stored in the memory 32 to the wireless module I/F 36, as indicated by an arrow 5f in FIG. 5. The wireless module I/F 36 transmits the transferred wireless packets (i.e., the response packets) to the wireless network. The CPU 31, which analyzes the contents of the packets and generates and transmits the response packets (i.e., the Ethernet packets or the wireless packets) to the MAC 35 or the wireless module I/F 36, is an example of the packet transmission controller.

Similarly as in the example of FIG. 4, if the wireless packets received from outside the image forming apparatus 10 are unrelated to the control of the image formation control device 20, the wireless packets are processed by the network control device 30, with the power supply PW1 to the image formation control device 20 being cut off. Consequently, the power consumption of the image forming apparatus 10 is reduced.

Further, since the CPU 31 converts the wireless packets received from outside the image forming apparatus 10 into the Ethernet packets, the process of receiving the converted Ethernet packets converted from the wireless packets is performed in a similar manner as in the example of FIG. 4. For example, the network controllers 33 and 34 are capable of filtering the wireless packets, too, with the filters F1 and F2, respectively. That is, the filtering function of the filters F1 and F2 is capable of filtering both the Ethernet packets and the wireless packets.

Since the network controllers 33 and 34 are capable of processing both the Ethernet packets and the wireless packets, it is unnecessary to provide a network controller (i.e., a filter) dedicated to the wireless packets, thereby reducing the circuit size of the network control device 30. Further, the CPU 31 executes the same packet analysis on the Ethernet packets and the wireless packets, and thus a load on the CPU 31 in the analysis is reduced.

In the network control device 30, the wireless module I/F 36 may be replaced by another interface that transmits and receives packets in a format other than the Ethernet packet format. The another interface may be connected to the wireless network or the wired network. Further, the CPU 31 may have a function of converting packets in a format other than the Ethernet packet format into the Ethernet packets. Thereby, the filters F1 and F2 are able to filter packet data in more diverse formats, contributing to a reduction in the power consumption of the image forming apparatus 10.

Figure 6:
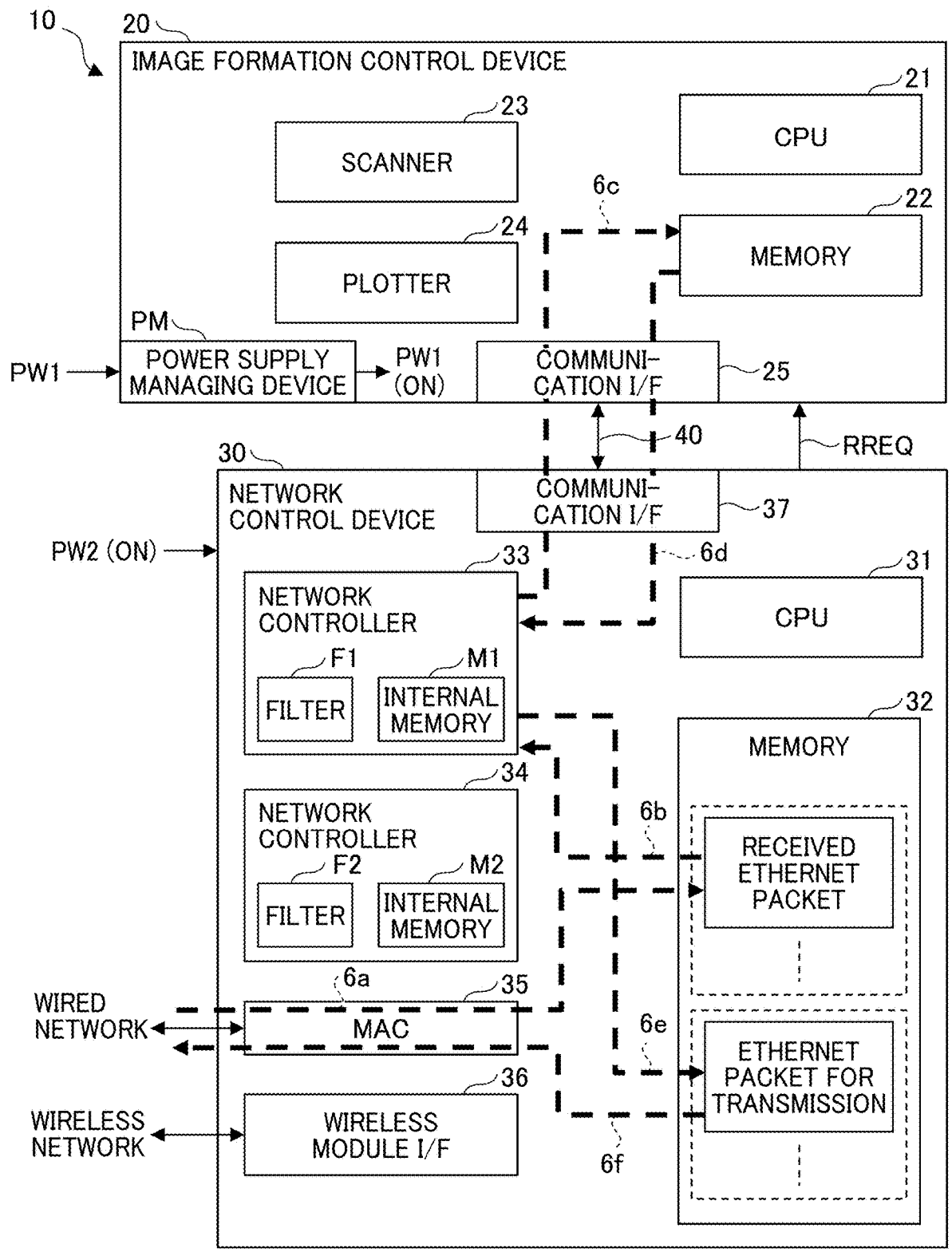
FIG. 6 is a diagram illustrating another example of the Ethernet packet reception process by the image forming apparatus of the first embodiment.

FIG. 6 is a diagram illustrating another example of the Ethernet packet reception process by the image forming apparatus 10 of the first embodiment in FIG. 1. Detailed description of parts of the process in FIG. 6 similar to those in FIG. 4 will be omitted. In FIG. 6, the buses MBUS and SBUS are omitted for clearer illustration. Further, in FIG. 6, the image formation control device 20 is set in the regular operating state. In the regular operating state, the power supply PW1 is supplied to all components of the image formation control device 20 by the power supply managing device PM (i.e., the power supply PW1 is ON). Further, the power supply PW2 to the network control device 30 is maintained (i.e., the power supply PW2 is ON).

When the image formation control device 20 is set in the regular operating state, the packets are transferred to the image formation control device 20 such that the CPU 21 of the image formation control device 20 executes the packet reception process. If the network control device 30 receives the wireless packets, the wireless packets are converted into the Ethernet packets and transferred to the image formation control device 20 to execute the packet reception process in the image formation control device 20, as described later with FIG. 7. It is therefore possible for the CPU 21 to execute the same packet reception process both when receiving the Ethernet packets and when receiving the wireless packets, thereby reducing a load on the CPU 21.

In FIG. 6, a process from the receipt of the Ethernet packets by the MAC 35 to the filtering process by the filter F1 and the storage of the valid Ethernet packets into the internal memory M1 of the network controller 33 is the same as that in FIG. 4. Further, in FIG. 6, a process of transmitting the Ethernet packets (i.e., the response packets) to the wired network by the MAC 35 is the same as that in FIG. 4. That is, processes indicated by arrows 6a, 6b, and 6f in FIG. 6 are the same as those indicated by the arrows 4a, 4b, and 4e in FIG. 4.

When the image formation control device 20 is set in the regular operating state, the network controller 33 stores the valid Ethernet packets from the internal memory M1 to the memory 22 of the image formation control device 20, as indicated by an arrow 6c in FIG. 6. The storage of the valid Ethernet packets into the memory 22 is executed with a data transfer function of the write DMAC 344 in FIG. 2. The setting of the transfer address of the write DMAC 344 is executed by the CPU 31, for example. When the Ethernet packets are stored in the memory 22, the CPU 21 reads the Ethernet packets from the memory 22 and analyzes the contents of the read Ethernet packets.

For example, if the analyzed contents of the Ethernet packets represent an instruction to perform the scanning operation, the CPU 21 controls the scanner 23 to scan a document, for example, and generates Ethernet packets (i.e., response packets) indicating the completion of the scanning operation. If the analyzed contents of the Ethernet packets are unrelated to the scanning operation or the plotting operation, the CPU 21 generates Ethernet packets (i.e., response packets) to be transmitted to the wired network. Then, the CPU 21 stores the generated Ethernet packets in the memory 22.

With the read DMAC 332 and the write DMAC 334 in FIG. 2, the network controller 33 reads the Ethernet packets stored in the memory 22 by the CPU 21, and stores the read Ethernet packets in the memory 32, as indicated by arrows 6d and 6e in FIG. 6. The setting of the transfer addresses of the read DMAC 332 and the write DMAC 334 in FIG. 2 is executed by the CPU 31, for example, but may be executed by the CPU 21.

Then, the MAC 35 transmits the Ethernet packets (i.e., the response packets) read from the memory 32 to the wired network, as indicated by the arrow 6f in FIG. 6. When the power supply PW1 to the image formation control device 20 is ON, therefore, the Ethernet packet reception process and the transmission of the response packets are performed similarly as in the example of FIG. 4.

Figure 7:
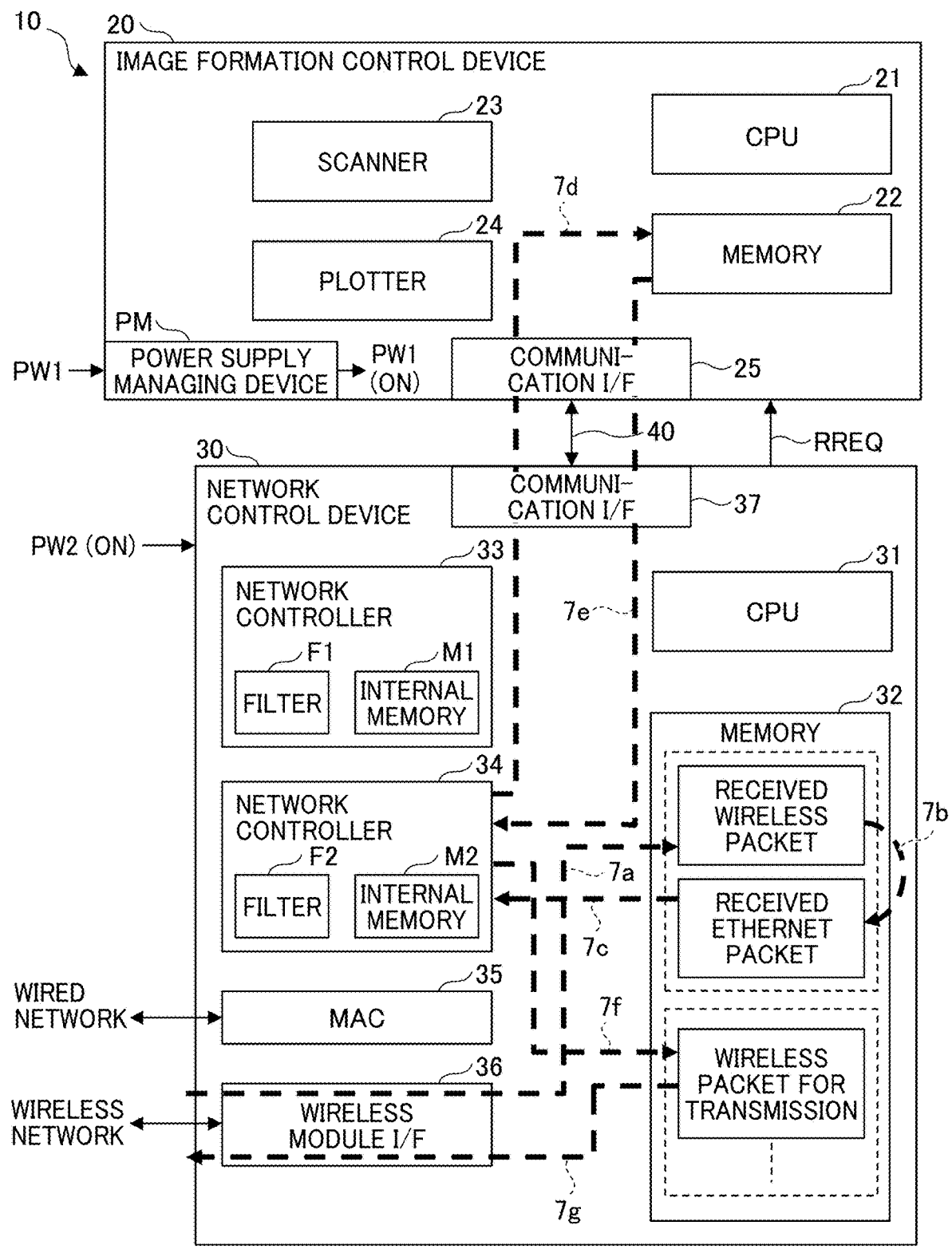
FIG. 7 is a diagram illustrating another example of the wireless packet reception process by the image forming apparatus of the first embodiment.

FIG. 7 is a diagram illustrating another example of the wireless packet reception process by the image forming apparatus 10 of the first embodiment in FIG. 1. Detailed description of parts of the process in FIG. 7 similar to those in FIGS. 4, 5, and 6 will be omitted. In FIG. 7, the buses MBUS and SBUS are omitted for clearer illustration. Similarly as in the example of FIG. 6, the image formation control device 20 is set in the regular operating state, in which the power supply PW1 is supplied to all components of the image formation control device 20 by the power supply managing device PM (i.e., the power supply PW1 is ON). Further, the power supply PW2 to the network control device 30 is maintained (i.e., the power supply PW2 is ON).

In FIG. 7, a process from the receipt of the wireless packets by the wireless module I/F 36 to the filtering process by the filter FT2 and the storage of the valid Ethernet packets into the internal memory M2 of the network controller 34 is the same as that in FIG. 5. That is, in FIG. 7, when the wireless packets received from outside the image forming apparatus 10 are stored in the memory 32, the CPU 31 converts the wireless packets into the Ethernet packets similarly as in FIG. 5.

Further, in FIG. 7, a process of transmitting the wireless packets (i.e., the response packets) to the wireless network by the wireless module I/F 36 is the same as that in FIG. 5. That is, processes indicated by arrows 7a, 7b, 7c, and 7g in FIG. 7 are the same as those indicated by the arrows 5a, 5b, 5c, and 5f in FIG. 5.

In FIG. 7, the transfer of the Ethernet packets to the memory 22 of the image formation control device 20 is similar to that in FIG. 6 except that the transfer is executed by the network controller 34. Further, the reading of the wireless packets stored in the memory 22 by the CPU 21 based on the packet analysis and the storage of the read wireless packets into the memory 32 are similar to those in FIG. 6 except that these processes are executed by the network controller 34.

That is, the network controller 34 stores the Ethernet packets from the internal memory M2 to the memory 22 of the image formation control device 20 with the data transfer function of the write DMAC 344 in FIG. 2, as indicated by an arrow 7d in FIG. 7. Further, with the read DMAC 332 and the write DMAC 334 in FIG. 2, the network controller 34 reads the wireless packets (i.e., the response packets) stored in the memory 22, and stores the read wireless packets into the memory 32, as indicated by arrows 7e and 7f in FIG. 7. Then, the wireless packets (i.e., the response packets) read from the memory 32 are transmitted to the wireless network by the wireless module I/F 36, as indicated by the arrow 7g in FIG. 7. When the power supply PW1 to the image formation control device 20 is ON, therefore, the wireless packet reception process and the transmission of the response packets are performed similarly as in the examples of FIGS. 4 and 6.

Figure 8:
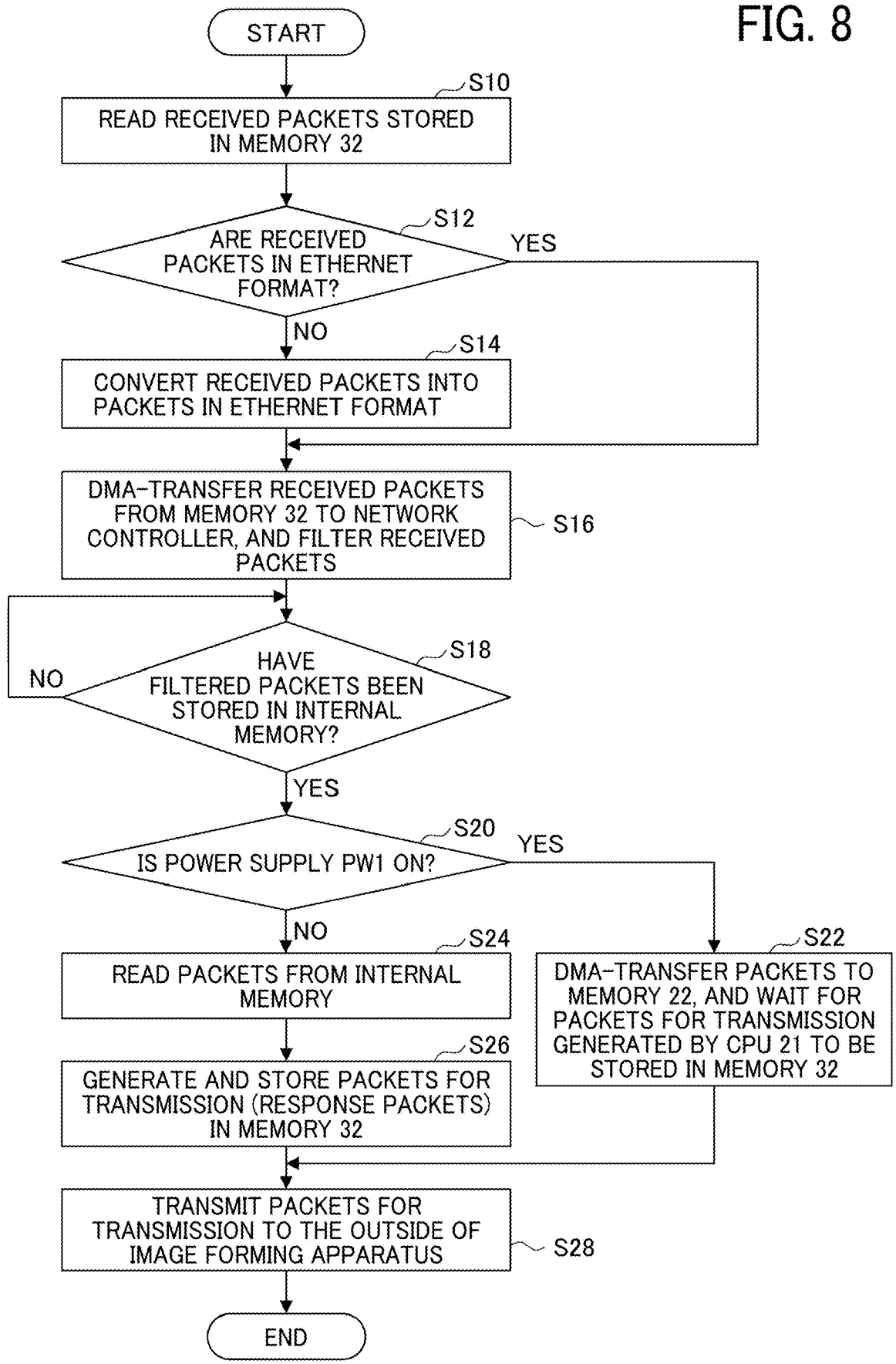
FIG. 8 is a flowchart illustrating an example of the operation of a central processing unit (CPU) of a network control device in the image forming apparatus of the first embodiment in response to receipt of packets unrelated to the operation of a scanner or plotter of the image forming apparatus.

FIG. 8 is a flowchart illustrating an example of the operation of the CPU 31 in response to receipt of packets unrelated to the operation of the scanner 23 or the plotter 24. The operation illustrated in FIG. 8 is performed with the network control program executed by the CPU 31, for example. That is, FIG. 8 illustrates an example of a network control method and an example of the network control program. The procedure illustrated in FIG. 8 starts when the CPU 31 processes the received packets stored in the memory 32.

At step S10, the CPU 31 first reads the received packets stored in the memory 32. Then, at step S12, the CPU 31 determines whether the received packets read from the memory 32 are in the Ethernet packet format. If the received packets are in the Ethernet packet format (YES at step S12), the CPU 31 executes the process of step S16. If the received packets are in a packet format other than the Ethernet packet format (NO at step S12), the CPU 31 executes the process of step S14. The packets in the packet format other than the Ethernet packet format are the wireless packets, for example.

At step S14, the CPU 31 converts the received packets in the packet format other than the Ethernet packet format into the packets in the Ethernet packet format, and stores the converted packets in the Ethernet packet format into the memory 32. Then, the CPU 31 proceeds to the process of step S16.

At step S16, the CPU 31 issues a DMA transfer instruction to the network controller 33 or 34 to DMA-transfer the received packets from the memory 32 to the network controller 33 or 34. The CPU 31 further causes the network controller 33 or 34 to execute the filtering process on the DMA-transferred received packets.

Then, at step S18, the CPU 31 determines whether the packets filtered through the filter F1 or F2 of the network controller 33 or 34 have been stored in the internal memory M1 or M2. After the filtered packets have been stored in the internal memory M1 or M2 (YES at step S18), the CPU 31 executes the process of step S20.

At step S20, the CPU 31 determines whether the power supply PW1 is set ON by the power supply managing device PM. If the power supply PW1 is ON, i.e., if the image formation control device 20 is in the regular operating state (YES at step S20), the CPU 31 executes the process of step S22. If the power supply PW1 is OFF, i.e., if the image formation control device 20 is the energy saving state (NO at step S20), the CPU 31 executes the process of step S24.

At step S22, the CPU 31 issues a DMA transfer instruction to the network controller 33 or 34 to DMA-transfer the packets held in the internal memory M1 or M2 to the memory 22 of the image formation control device 20. Then, the CPU 31 waits for the CPU 21 of the image formation control device 20 to generate packets for transmission based on the packets DMA-transferred to the memory 22 and transfer the generated packets for transmission to the memory 32. After the packets for transmission generated by the CPU 21 have been transferred to the memory 32, the CPU 31 executes the process of step S28.

At step S24, on the other hand, the CPU 31 reads the packets held in the internal memory M1 or M2. Then, at step S26, the CPU 31 generates packets for transmission (i.e., response packets) based on the packets read from the internal memory M1 or M2, and stores the generated packets for transmission in the memory 32.

Then, at step S28, the CPU 31 issues an instruction to the MAC 35 to transmit the packets for transmission (i.e., the Ethernet packets) held in the memory 32 to the wired network, and completes the operation. Alternatively, the CPU 31 issues an instruction to the wireless module I/F 36 to transmit the packets for transmission (i.e., the wireless packets) held in the memory 32 to the wireless network, and completes the operation. Thereby, the packets for transmission (i.e., the response packets) are transmitted to the outside of the image forming apparatus 10.

Figure 9:
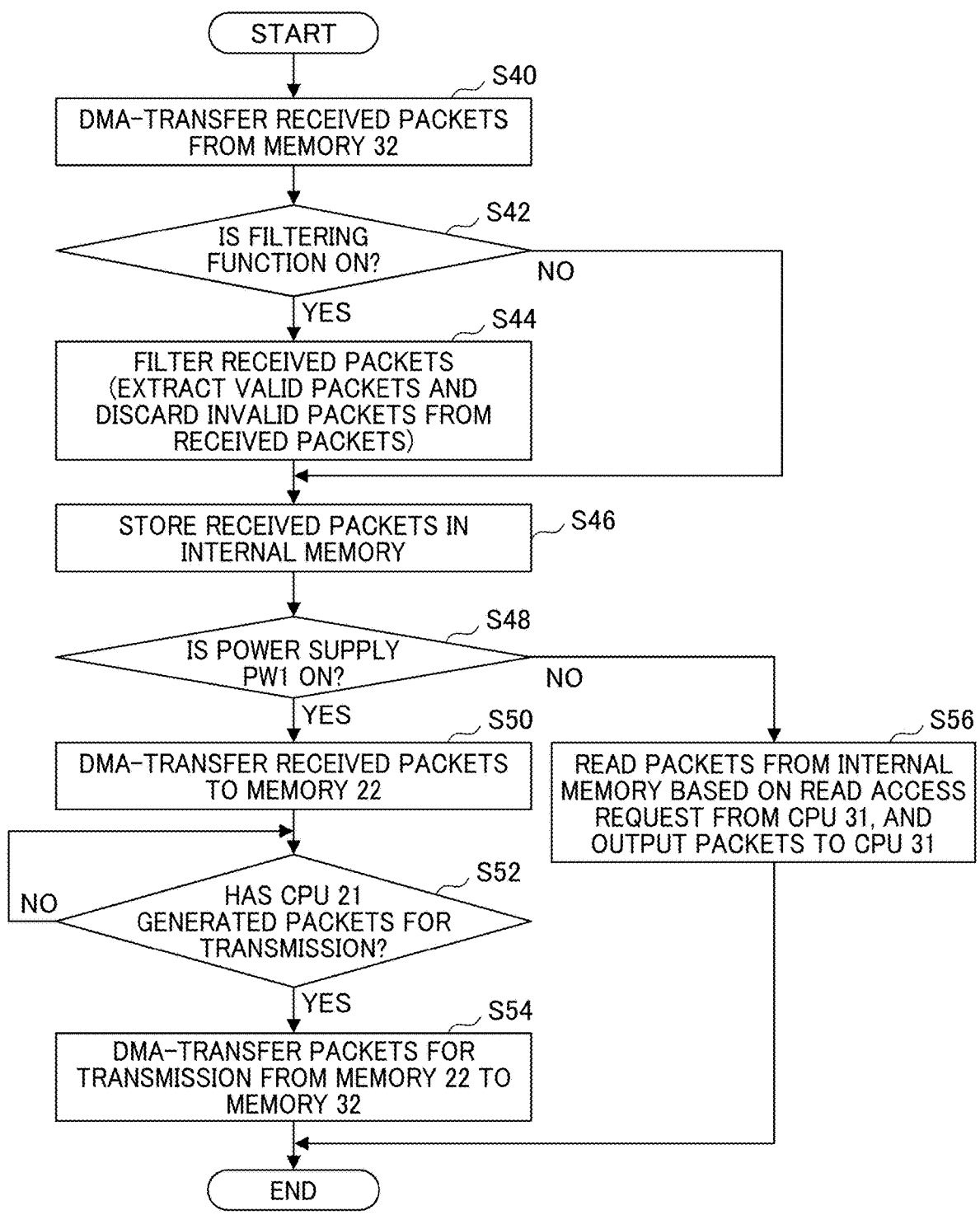
FIG. 9 is a flowchart illustrating an example of the operation of the network controller of the first embodiment in response to receipt of packets.

FIG. 9 is a flowchart illustrating an example of the operation of the network controller 33 or 34 in response to receipt of packets. That is, FIG. 9 illustrates an example of the network control method. The procedure of FIG. 9 starts based on the DMA transfer instruction issued by the CPU 31 at step S16 in FIG. 8. The network controllers 33 and 34 operate similarly, and thus the following description will be limited to the operation of the network controller 33.

At step S40, the network controller 33 first operates the read DMAC 342 to DMA-transfer the received packets (i.e., the Ethernet packets) from the memory 32. Then, at step S42, the network controller 33 determines whether the filtering function of the filter F1 is ON by referring to the register 352 in FIG. 2. If the filtering function is ON (YES at step S42), the network controller 33 executes the process of step S44. If the filtering function is OFF (NO at step S42), the network controller 33 executes the process of step S46.

At step S44, the network controller 33 executes the filtering process on the Ethernet packets with the filter F1, and proceeds to the process of step S46. In this process, the valid Ethernet packets are extracted, and the invalid Ethernet packets are discarded.

At step S46, the network controller 33 stores the valid Ethernet packets passed through the filter F1 into the internal memory M1. If the filtering function of the filter F1 is OFF, the filtering process on the Ethernet packets is not executed. In this case, all Ethernet packets are stored in the internal memory M1 as the valid packets.

Then, at step S48, the network controller 33 determines whether the power supply PW1 is set ON by the power supply managing device PM. If the power supply PW1 is ON, i.e., if the image formation control device 20 is in the regular operating state (YES at step S48), the network controller 33 determines to generate the packets for transmission with the CPU 21, and executes the process of step S50. If the power supply PW1 is OFF, i.e., if the image formation control device 20 is in the energy saving state (NO at step S48), on the other hand, the network controller 33 determines to generate the packets for transmission with the CPU 31, and executes the process of step S56.

At step S48, the network controller 33 may determine which one of the process of step S50 and the process of step S56 is to be executed in accordance with the switching state of the selector SEL. In this case, if the internal memory M1 is connected to the write DMAC 344 by the selector SEL, the network controller 33 executes the process of step S50. If the internal memory M1 is connected to the memory access controller 354 by the selector SEL, the network controller 33 executes the process of step S56.

At step S50, the network controller 33 operates the write DMAC 344 to DMA-transfer the received packets held in the internal memory M1 to the memory 22, and proceeds to the process of step S52.

At step S52, the network controller 33 determines whether the packets for transmission have been generated by the CPU 21. After the CPU 21 have generated the packets for transmission (YES at step S52), the network controller 33 executes the process of step S54.

At step S54, the network controller 33 operates the read DMAC 332 and the write DMAC 334 to DMA-transfer the packets for transmission, which have been generated by the CPU 21 and stored in the memory 22, to the memory 32 from the memory 22, and completes the operation.

At step S56, on the other hand, the network controller 33 waits for a read access request from the CPU 31 that requests the reading from the internal memory M1. The network controller 33 then reads the packets from the internal memory M1 based on the read access request, outputs the read packets to the CPU 31, and completes the operation.

In the operation of the network controller 33 illustrated in FIG. 9, the processes of steps S40 to S48 are performed in both the regular operating state and the energy saving state. Further, the processes of steps S50 to S54 are performed in the regular operating state, and the process of step S56 is performed in the energy saving state.

Figure 10:
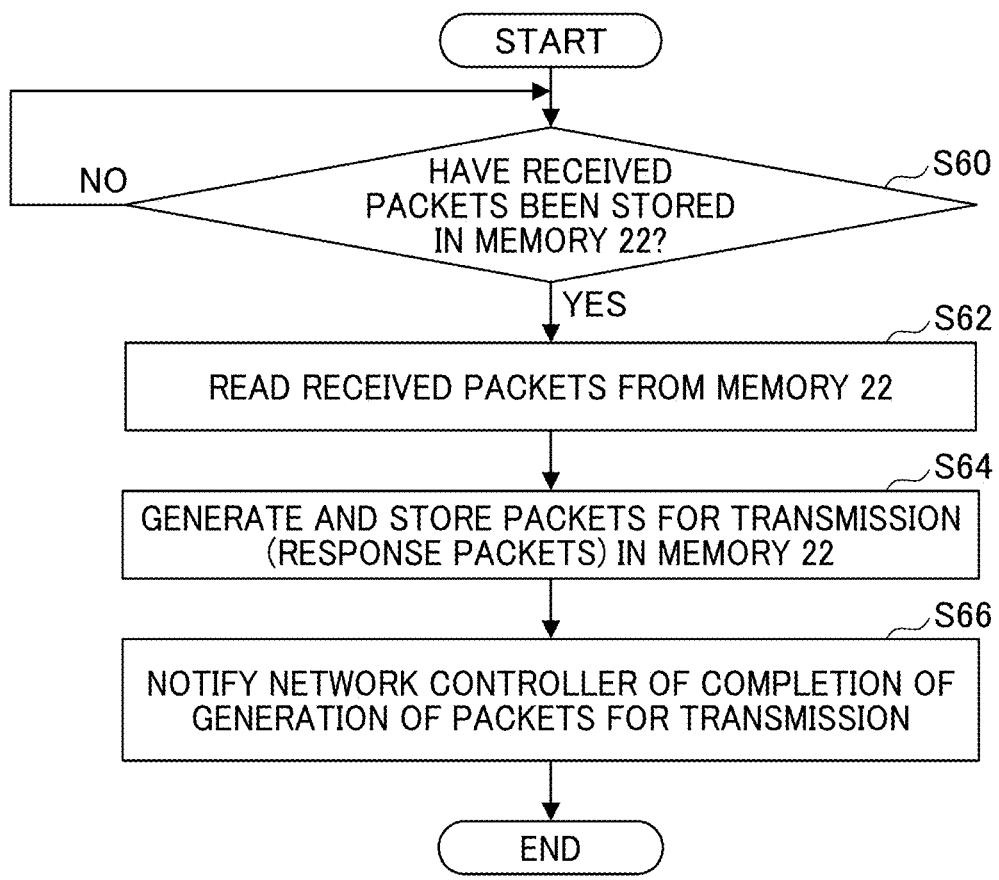
FIG. 10 is a flowchart illustrating an example of the operation of a CPU of an image formation control device in the image forming apparatus of the first embodiment in response to receipt of packets unrelated to the operation of the scanner or plotter of the image forming apparatus.

FIG. 10 is a flowchart illustrating an example of the operation of the CPU 21 in response to receipt of packets unrelated to the operation of the scanner 23 or the plotter 24. The procedure illustrated in FIG. 10 starts when the DMA transfer of the received packets from the internal memory M1 to the memory 22 starts at step S50 in FIG. 9.

The CPU 21 first determines at step S60 whether the received packets have been stored in the memory 22. After the received packets have been stored in the memory 22 (YES at step S60), the CPU 21 executes the process of step S62.

At step S62, the CPU 21 reads the received packets stored in the memory 22. Then, at step S64, the CPU 21 generates the packets for transmission (i.e., the response packets) based on the received packets read from the memory 22, and stores the generated packets for transmission in the memory 22.

Then, at step S66, the CPU 21 notifies the network controller 33 or 34 of the completion of the generation of the packets for transmission, and completes the operation. After the process of step S66, the network controller 33 or 34 executes the process of step S54 in FIG. 9.

Figure 11:
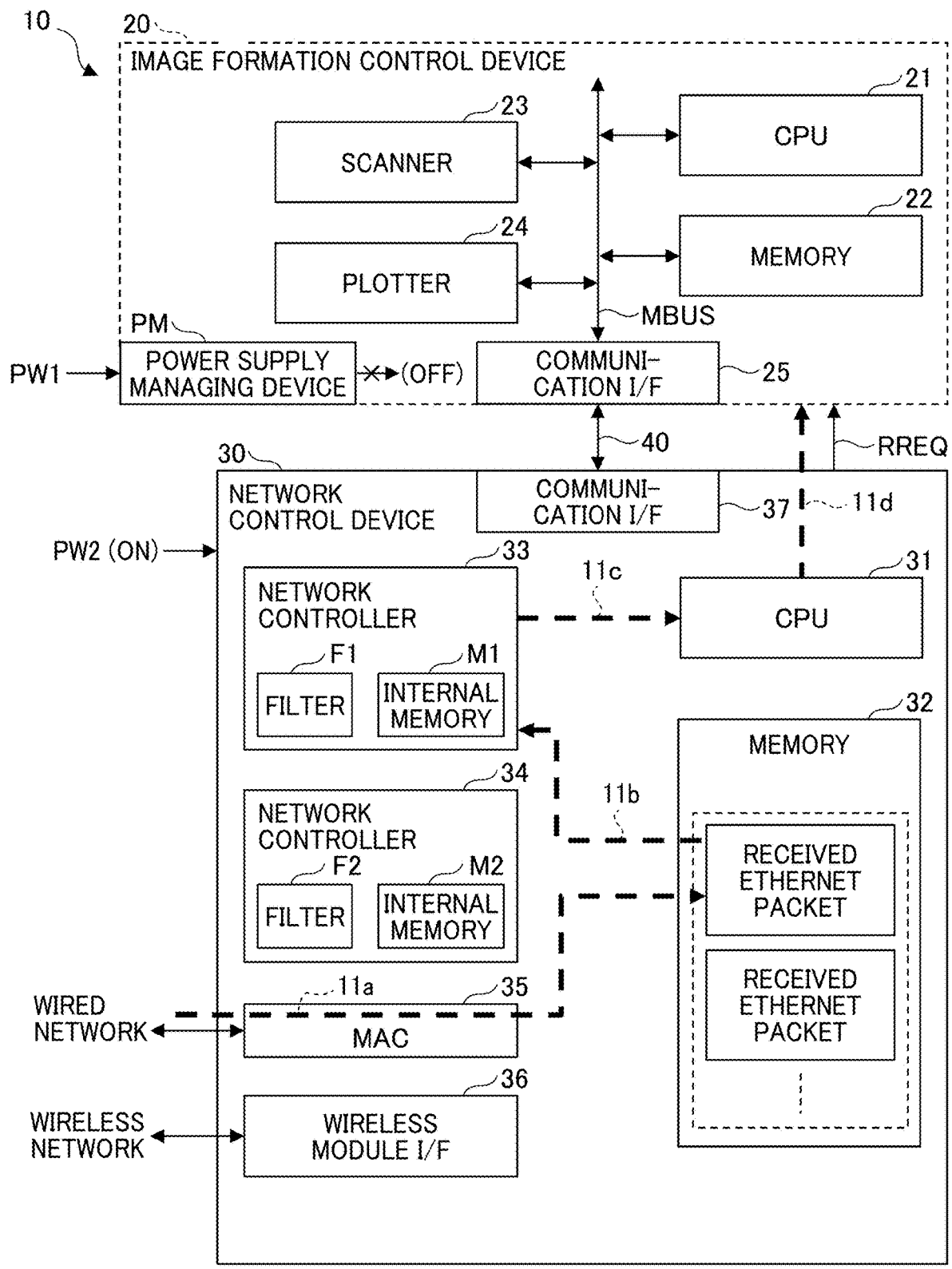
FIG. 11 is a diagram illustrating an example of a packet reception process for bringing the image formation control device of the first embodiment back to a regular operating state from an energy saving state.

FIG. 11 is a diagram illustrating an example of a packet reception process for bringing the image formation control device 20 in FIG. 1 back to the regular operating state from the energy saving state. Detailed description of parts of the process in FIG. 11 similar to those in FIG. 4 will be omitted.

Similarly as in the example of FIG. 4, the MAC 35 first stores the Ethernet packets received from the wired network into the memory 32, as indicated by an arrow 11a in FIG. 11. Herein, the Ethernet packets received by the MAC 35 are return packets representing a return instruction for bringing the image formation control device 20 back to the regular operating state from the energy saving state. For example, the return packets are scan instruction packets for executing the scanning operation or plot instruction packets for executing the plotting operation. The return packets may also be issued from outside the image forming apparatus 10 to operate the image formation control device 20 for a reason other than executing the scanning operation or the plotting operation.

With the filter F1, the network controller 33 filters the Ethernet packets read from the memory 32, as indicated by an arrow 11b in FIG. 11. The network controller 33 stores the valid Ethernet packets passed through the filter F1 (i.e., the return packets) into the internal memory M1. Since the image formation control device 20 is in the energy saving state, the return packets stored in the internal memory M1 are read by the CPU 31, as indicated by an arrow 11c in FIG. 11.

The CPU 31 analyzes the packets read from the internal memory M1. Since the analyzed packets are the return packets for brining the image formation control device 20 back to the regular operating state from the energy saving state, the CPU 31 outputs the return request signal RREQ to the image formation control device 20, as indicated by an arrow 11d in FIG. 11. If the packets analyzed by the CPU 31 are processable by the network control device 30 alone, an operation similar to that in FIG. 4 is executed.

In the image formation control device 20, in response to receipt of the return request signal RREQ by the reception circuit that operates in the energy saving state, the power supply managing device PM outputs the power supply PW1. Thereby, the power supply PW1 is supplied to all circuits of the image formation control device 20, bringing the image formation control device 20 back to the regular operating state from the energy saving state. Consequently, components such as the CPU 21 are started, and the image formation control device 20 returns to the regular operating state, in which operations such as the scanning operation and the plotting operation are executable.

When the wireless module I/F 36 receives the return packets, a process similar to that in FIG. 11 is executed.

Figure 12:
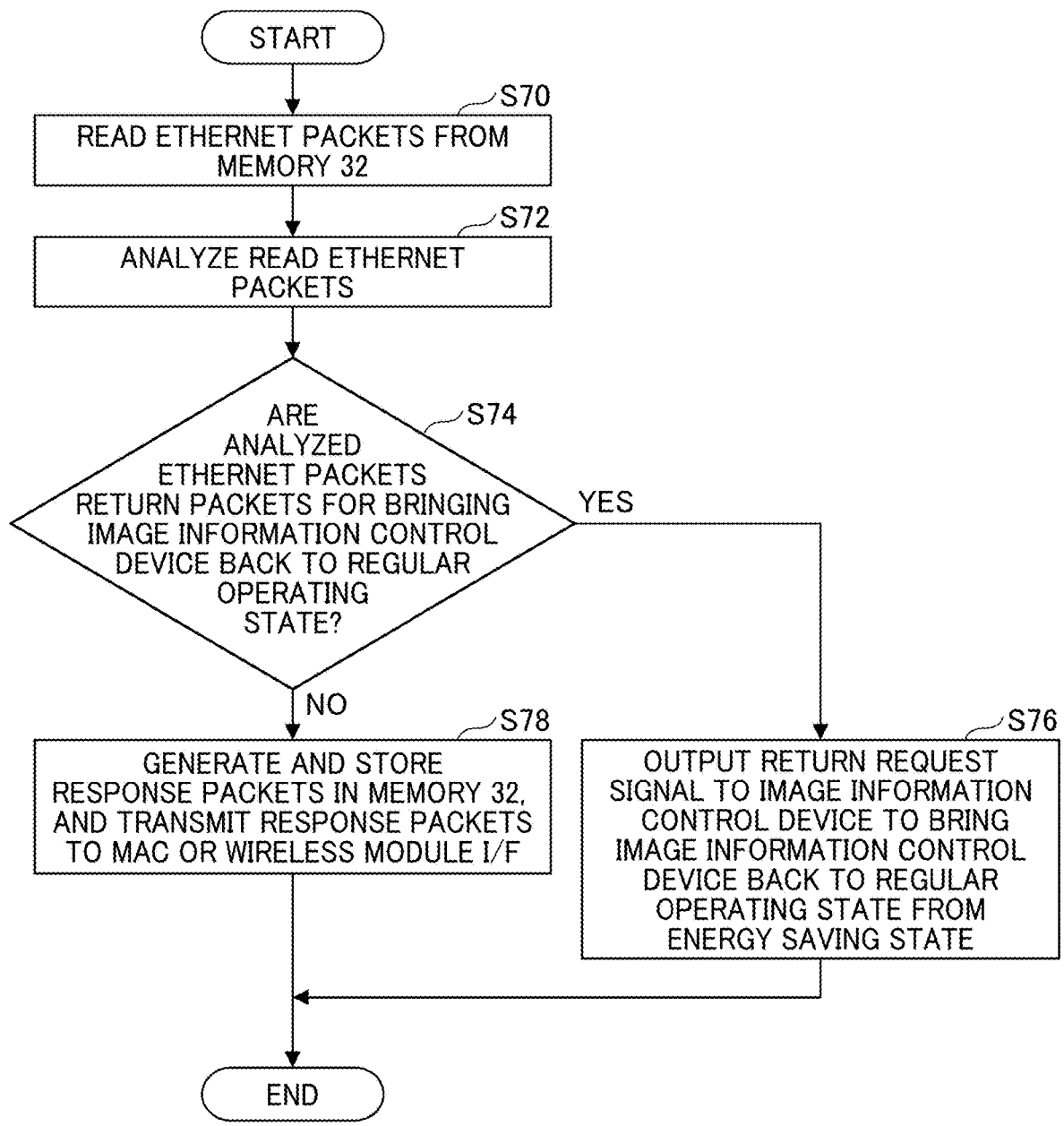
FIG. 12 is a flowchart illustrating an example of an Ethernet packet reception process by the CPU of the network control device of the first embodiment.

FIG. 12 is a flowchart illustrating an example of an Ethernet packet reception process by the CPU 31 of the network control device 30 in FIG. 1. That is, FIG. 12 illustrates an example of the network control method performed by the CPU 31 and an example of the network control program executed by the CPU 31. The procedure of FIG. 12 is applicable not only to the process of receiving the Ethernet packets received from the wired network but also to the process of receiving the converted Ethernet packets converted from the wireless packets received from the wireless network.

The procedure illustrated in FIG. 12 starts when the CPU 31 detects the storage of the Ethernet packets in the memory 32. For example, the CPU 31 may periodically access the memory 32 to detect the storage of the Ethernet packets in the memory 32. Alternatively, based on a storage notification from the network controller 33 or 34 notifying the storage of the Ethernet packets in the memory 32, the CPU 31 may detect that the Ethernet packets have been stored in the memory 32.

The CPU 31 first reads at step S70 the Ethernet packets stored in the memory 32. Then, at step S72, the CPU 31 analyzes the Ethernet packets read from the memory 32.

Then, at step S74, the CPU 31 determines whether the analyzed Ethernet packets are the return packets for bringing the image formation control device 20 back to the regular operating state from the energy saving state. If the analyzed Ethernet packets are the return packets for bringing the image formation control device 20 back to the regular operating state (YES at step S74), the CPU 31 executes the process of step S76. If the analyzed Ethernet packets are not the return packets (NO at step S74), the CPU 31 executes the process of step S78.

At step S76, the CPU 31 outputs the return request signal RREQ to the image formation control device 20, as described above with FIG. 11. Thereby, the CPU 31 causes the image formation control device 20 to turn on the power supply PW1 to bring the image formation control device 20 back to the regular operating state from the energy saving state, and completes the Ethernet packet reception process.

At step S78, on the other hand, the CPU 31 generates the packets to be transmitted to the outside of the image forming apparatus 10 (i.e., the response packets), as described above with FIGS. 4 and 5, and stores the generated packets in the memory 32. When responding to the Ethernet packets received via the wired network, the CPU 31 generates and stores Ethernet packets for transmission in a memory area of the memory 32 for storing the Ethernet packets for transmission.

When responding to the wireless packets received via the wireless network, the CPU 31 generates and stores wireless packets for transmission in a memory area of the memory 32 for storing the wireless packets for transmission. The CPU 31 then transmits the packets for transmission stored in the memory 32 to the MAC 35 or the wireless module I/F 36 in accordance with the type of the packets for transmission, and completes the Ethernet packet reception process.

After the process of step S76, the CPU 31 may execute the process of step S78 and generate response packets for notifying that the image formation control device 20 has been brought back to the regular operating state. Then, the CPU 31 may transmit the response packets to the outside of the image forming apparatus 10.

As described above, according to the first embodiment, packets according to different communication systems are converted into the same type of packets to be filtered by the same type of filters. It is thereby possible to extract valid packets from the packets according to the different communication systems by discarding invalid packets unrelated to the operation of the image forming apparatus 10, and thus to reduce the number of packets to be subjected to the packet reception process. Consequently, the load on the CPU 31 or 21 is reduced, reducing the power consumption of the image forming apparatus 10.

Further, the process of analyzing the received packets and generating the packets for transmission is executable by the CPU 21 or 31. Even if the image formation control device 20 is set in the energy saving state and the operation of the CPU 21 is stopped, therefore, it is possible to analyze the received packets and generate the packets for transmission with the CPU 31. Consequently, the power consumption of the image forming apparatus 10 is reduced.

With the configuration of the network controllers 33 and 34 illustrated in FIG. 2, it is possible to transfer, read, or write packets by specifying the address both in the regular operating state and the energy saving state. The CPU 21 or 31 is capable of generating the packets for transmission (i.e., the response packets) in accordance with the format of the received packets.

A second embodiment of the present invention will be described. Detailed description of components, functions, and operations of the second embodiment similar to those of the first embodiment illustrated in FIGS. 1 to 12 will be omitted.

Figure 13:
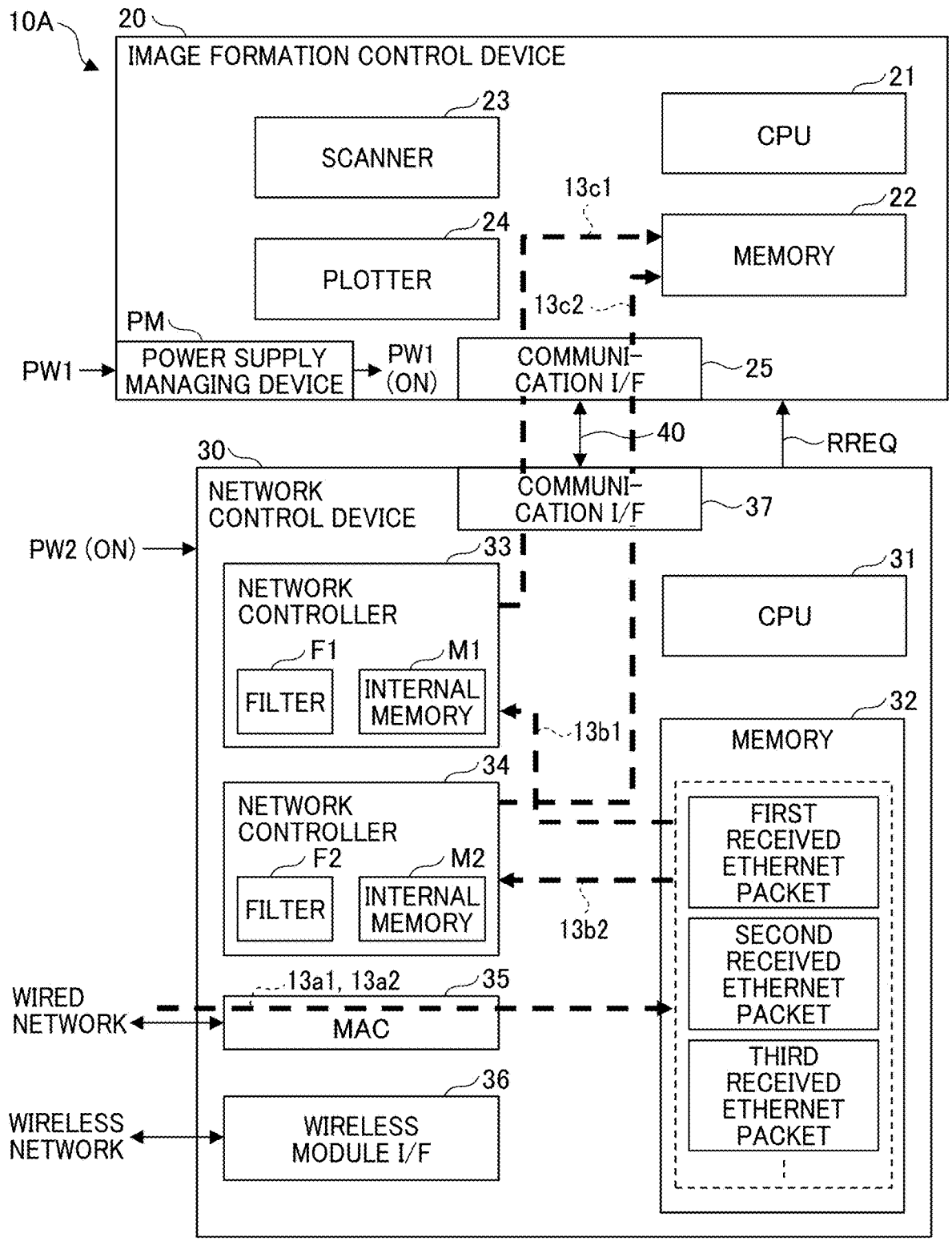
FIG. 13 is a diagram illustrating an example of an Ethernet packet reception process by an image forming apparatus of a second embodiment of the present invention.

FIG. 13 is a diagram illustrating an example of an Ethernet packet reception process by an image forming apparatus 10A of the second embodiment of the present invention. Components of the image forming apparatus 10A are similar to those of the image forming apparatus 10 illustrated in FIG. 1. However, the operations of the network controllers 33 and 34 in the image forming apparatus 10A are different from those in the image forming apparatus 10 described above with FIGS. 6 and 7. For example, the network controllers 33 and 34 of the image forming apparatus 10A alternately operate.

In FIG. 13, the buses MBUS and SBUS are omitted for clearer illustration, but the image formation control device 20 and the network control device 30 include the buses MBUS and SBUS, respectively, similarly as in FIG. 1. In the example of FIG. 13, the image formation control device 20 is set in the regular operating state to supply the power supply PW1 to all components of the image formation control device 20 (i.e., the power supply PW1 is ON). Further, the power supply PW2 to the network control device 30 is maintained (i.e., the power supply PW2 is ON).

The MAC 35 of the network control device 30 first receives the Ethernet packets from the wired network, and stores the Ethernet packets in the memory 32 in the order of receipt of the Ethernet packets, as indicated by arrows 13a1 and 13a2 in FIG. 13. The network controllers 33 and 34 alternately operate. If the Ethernet packets are held in the memory 32, the network controllers 33 and 34 alternately read the Ethernet packets from the memory 32 in the order of receipt of the Ethernet packets, as indicated by arrows 13b1 and 13b2 in FIG. 13. The network controllers 33 and 34 alternately execute the packet reception process, but the operation time of the network controller 33 and the operation time of the network controller 34 overlap at least partially. That is, the network controllers 33 and 34 operate in parallel.

The network controller 33 filters the read Ethernet packets with the filter F1, and stores the valid Ethernet packets extracted through the filtering process into the internal memory M1 of the network controller 33 in FIG. 2. Similarly, the network controller 34 filters the read Ethernet packets with the filter F2, and stores the valid Ethernet packets extracted through the filtering process into the internal memory M2 of the network controller 34 in FIG. 2.

For example, the network controller 33 executes the packet reception process by controlling the transfer of the odd-numbered Ethernet packets received by the MAC 35.

Further, the network controller 34 executes the packet reception process by controlling the transfer of the even-numbered Ethernet packets received by the MAC 35. For example, therefore, the read DMAC 342 in FIG. 2 has a function of generating the transfer source address for every other one of the packets and successively generating the transfer destination addresses. Further, the write DMAC 344 in FIG. 2 has a function of successively generating the transfer source addresses and generating the transfer destination address for every other one of the packets.

Thereby, the network controllers 33 and 34 correctly read the Ethernet packets from the memory 32 in the order of receipt of the Ethernet packets by the MAC 35. Further, the network controllers 33 and 34 store the filtered valid packets in the memory 22 in the order of receipt of the Ethernet packets by the MAC 35.

In FIG. 13, the image formation control device 20 is set in the regular operating state. Therefore, the network controller 33 stores the valid Ethernet packets from the internal memory M1 to the memory 22 of the image formation control device 20 with the data transfer function of the write DMAC 344 in FIG. 2, as indicated by an arrow 13c1 in FIG. 13. Similarly, the network controller 34 stores the valid Ethernet packets from the internal memory M2 to the memory 22 of the image formation control device 20 with the data transfer function of the write DMAC 344 in FIG. 2, as indicated by an arrow 13c2 in FIG. 13.

When the Ethernet packets are stored in the memory 22, the CPU 21 reads the Ethernet packets from the memory 22 and analyzes the contents of the read Ethernet packets. A subsequent process until the packets for transmission generated by the CPU 21 are transmitted from the MAC 35 to the wired network is similar to that described above with FIG. 6.

The packets for transmission generated by the CPU 21 and stored in the memory 22 may be alternately transferred by the read DMAC 332 and the write DMAC 334 of the network controller 33 and the read DMAC 332 and the write DMAC 334 of the network controller 34 in FIG. 2. In this case, the odd-numbered packets for transmission stored in the memory 22 are transferred to the memory 32 by the read DMAC 332 and the write DMAC 334 of the network controller 33, and the even-numbered packets for transmission stored in the memory 22 are transferred to the memory 32 by the read DMAC 332 and the write DMAC 334 of the network controller 34, for example.

For example, therefore, the read DMAC 332 has a function of generating the transfer source address for every other one of the packets and successively generating the transfer destination addresses. Further, the write DMAC 334 has a function of successively generating the transfer source addresses and generating the transfer destination address for every other one of the packets. Thereby, the network controllers 33 and 34 read the packets for transmission from the memory 22 and store the read packets for transmission in the memory 32 in the order of generation of the packets for transmission by the CPU 21.

The packets for transmission generated by the CPU 21 and stored in the memory 22 may be transferred to the memory 32 by the read DMAC 332 and the write DMAC 334 of one of the network controllers 33 and 34. In this case, the read DMAC 332 and the write DMAC 334 successively generate the transfer source addresses and the transfer destination addresses, respectively.

As illustrated in FIG. 13, the network controllers 33 and 34 alternately operate to execute the packet reception process. Thereby, the performance of transferring the Ethernet packets from the memory 32 and the performance of transferring the Ethernet packets to the memory 22 are improved as compared with those in the example of FIG. 6. Further, the performance of transferring the packets for transmission generated by the CPU 21 from the memory 22 to the memory 32 is improved as compared with that in the example of FIG. 6.

In other words, a function of incrementing the transfer source addresses and the transfer destination addresses differently is provided to the read DMAC 342 and the write DMAC 344 and to the read DMAC 332 and the write DMAC 334 in FIG. 2, thereby improving the transfer performance.

In the example illustrated in FIG. 13, the packet reception process is applied to the process of receiving the Ethernet packets received from the wired network. The packet reception process is also applicable to the process of receiving the wireless packets received from the wireless network. In this case, the CPU 31 executes a process of converting the wireless packets stored in the memory 32 into the Ethernet packets similarly as in the example of FIG. 7.

Figure 14:
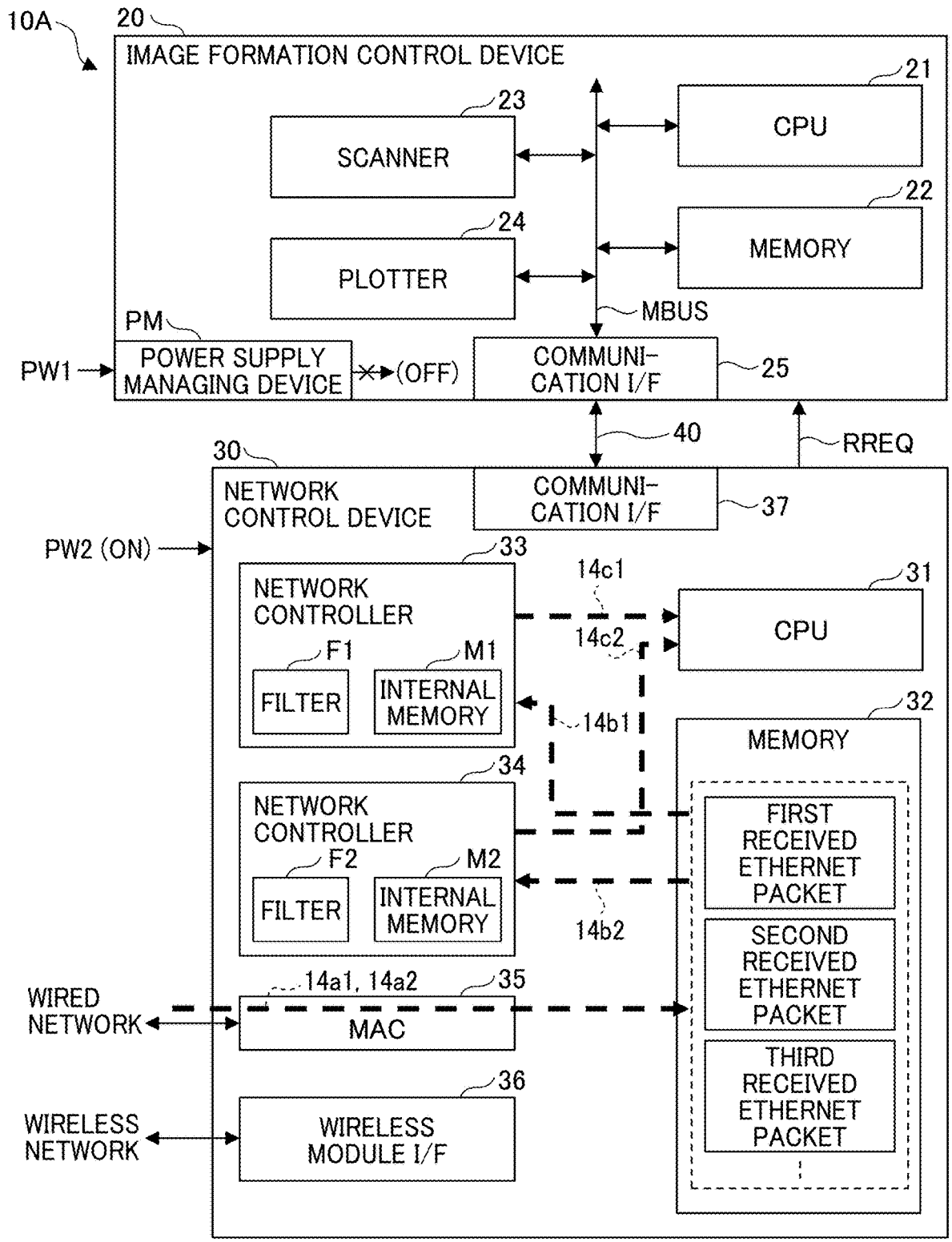
FIG. 14 is a diagram illustrating another example of the Ethernet packet reception process by the image forming apparatus of the second embodiment.

FIG. 14 is a diagram illustrating another example of the Ethernet packet reception process by the image forming apparatus 10A of the second embodiment in FIG. 13. Detailed description of parts of the process in FIG. 14 similar to those in FIGS. 4 and 13 will be omitted. The bus SBUS is omitted in FIG. 14 for clearer illustration. In FIG. 14, the image formation control device 20 is set in the power saving state.

In FIG. 14, a process from the receipt of the Ethernet packets by the MAC 35 of the network control device 30 to the transfer of the Ethernet packets from the memory 32 to the network controllers 33 and 34 is the same as that in FIG. 13, as indicated by arrows 14a1, 14a2, 14b1, and 14b2 in FIG. 14.

In FIG. 14, the image formation control device 20 is set in the energy saving state. Therefore, the CPU 31 reads the valid Ethernet packets stored in the internal memory M1 of the network controller 33 in FIG. 2, as indicated by an arrow 14c1 in FIG. 14. Further, the CPU 31 reads the valid Ethernet packets stored in the internal memory M2 of the network controller 34 in FIG. 2, as indicated by an arrow 14c2 in FIG. 14. The CPU 31 alternately reads the Ethernet packets from the internal memories M1 and M2 to execute the packet reception process (i.e., the analysis of the contents of the Ethernet packets and the generation of the packets for transmission) in the order of receipt of the Ethernet packets. A subsequent process from the sequential storage of the packets for transmission generated by the CPU 31 into the memory 32 to the transmission of the packets for transmission from the MAC 35 to the wired network is similar to that described above with FIG. 4.

In the example of FIG. 14, the network controllers 33 and 34 correctly read the Ethernet packets from the memory 32 in the order of receipt of the Ethernet packets by the MAC 35 similarly as in the example of FIG. 13.

In the example illustrated in FIG. 14, the packet reception process is applied to the process of receiving the Ethernet packets received from the wired network. The packet reception process is also applicable to the process of receiving the wireless packets received from the wireless network. In this case, the CPU 31 executes a process of converting the wireless packets stored in the memory 32 into the Ethernet packets similarly as in the example of FIG. 5.

As described above, effects similar to those of the first embodiment are obtained in the second embodiment. For example, packets according to different communication systems are converted into the same type of packets to be filtered by the same type of filters. It is thereby possible to extract valid packets from the packets according to the different communication systems, and thus to reduce the number of packets to be subjected to the packet reception process. Consequently, the load on the CPU 31 or 21 is reduced, reducing the power consumption of the image forming apparatus 10A.

Further, in the second embodiment, the performance of transferring the Ethernet packets from the memory 32 and the performance of transferring the Ethernet packets to the memory 22 are improved as compared with those in the example of FIG. 6. Further, the performance of transferring the packets for transmission generated by the CPU 21 from the memory 22 to the memory 32 is improved as compared with that in the example of FIG. 6. In other words, a function of incrementing the transfer source addresses and the transfer destination addresses differently is provided to the read DMAC 342 and the write DMAC 344 and to the read DMAC 332 and the write DMAC 334 in FIG. 2, thereby improving the transfer performance.

A third embodiment of the present invention will be described. Detailed description of components, functions, and operations in FIG. 15 similar to those in FIGS. 1 to 14 will be omitted.

Figure 15:
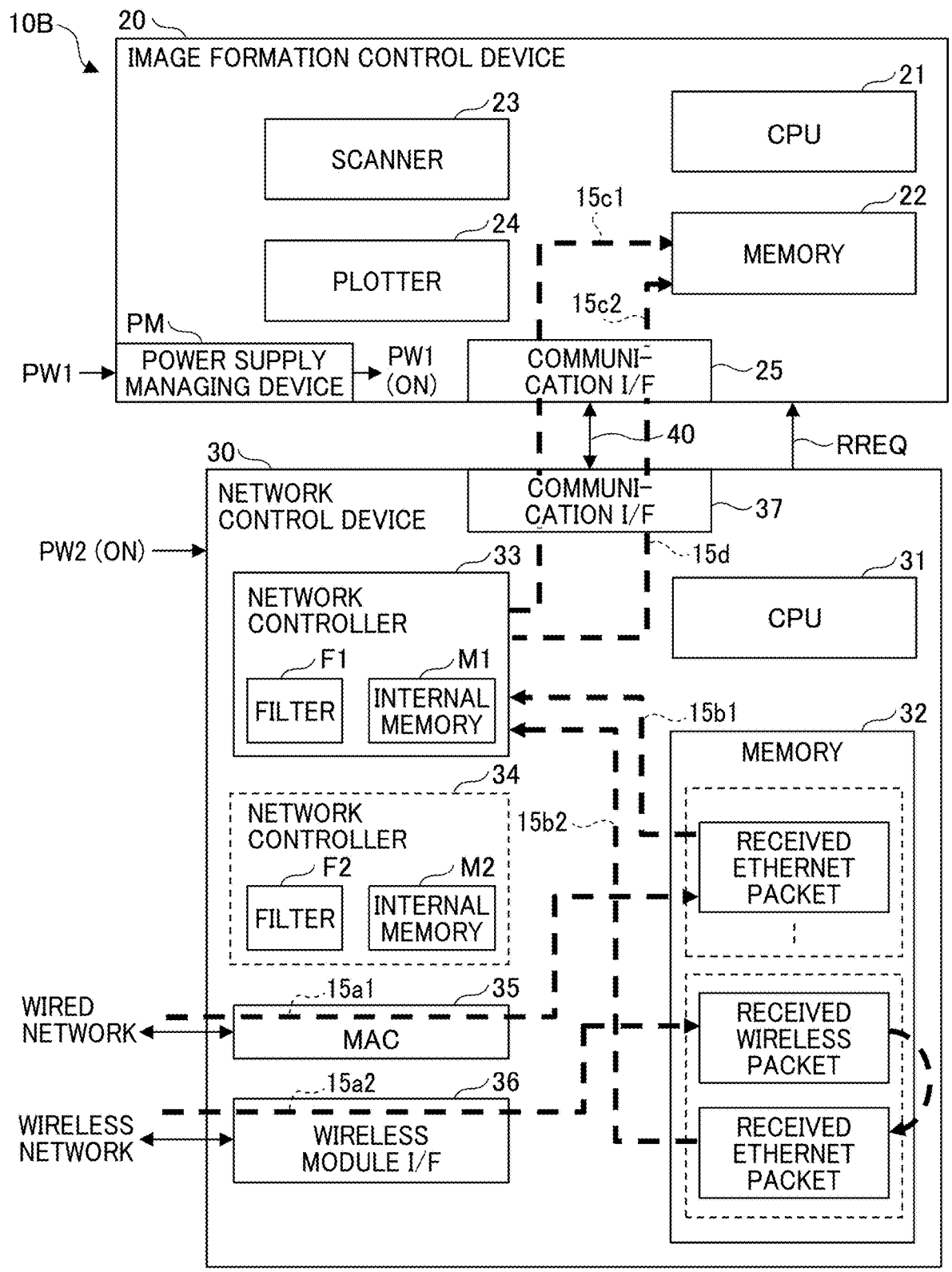
FIG. 15 is a diagram illustrating an example of an Ethernet packet reception process by an image forming apparatus of a third embodiment of the present invention.

FIG. 15 is a diagram illustrating an example of an Ethernet packet reception process by an image forming apparatus 10B of the third embodiment of the present invention. Components of the image forming apparatus 10B are similar to those of the image forming apparatus 10 in FIG. 1. However, the operations of the network controllers 33 and 34 in the image forming apparatus 10B are different from those in the image forming apparatus 10 described above with FIGS. 6 and 7. In FIG. 15, the buses MBUS and SBUS are omitted for clearer illustration.

For example, the network controller 33 executes the process of receiving both the Ethernet packets and the wireless packets received by the network control device 30. The network controller 34 is set in an energy saving state, in which the network controller 34 stops operating with the supply of clock signals thereto being stopped, for example. A broken-line frame representing the network controller 34 indicates that the network controller 34 is set in the energy saving state.

If the packets to be received by the network control device 30 are increased too much to be processed by the network controller 33 alone, however, the network controller 34 may operate. In this case, the network controllers 33 and 34 may alternately operate similarly as in the example of FIG. 13.

The MAC 35 of the network control device 30 receives the Ethernet packets from the wired network, and stores the Ethernet packets in the memory 32 in the order of receipt of the Ethernet packets, as indicated by an arrow 15a1 in FIG. 15. The wireless module I/F 36 of the network control device 30 receives the wireless packets from the wireless network, and stores the wireless packets in the memory 32 in the order of receipt of the wireless packets, as indicated by an arrow 15a2 in FIG. 15.

For example, a memory area for storing the Ethernet packets and a memory area for storing the wireless packets are allocated separately in the memory 32. The ethernet packets and the wireless packets asynchronously supplied to the network control device 30 are therefore held in the memory 32 in the order of receipt of the Ethernet packets and the wireless packets. The wireless packets are converted into the Ethernet packets by the CPU 31 and stored in the memory 32.

If the Ethernet packets are held in the memory 32, the network controller 33 reads the Ethernet packets from the memory 32 in the order of receipt of the Ethernet packets, as indicated by an arrow 15b1 in FIG. 15. If the converted Ethernet packets converted from the wireless packets are held in the memory 32, the network controller 33 reads the converted Ethernet packets from the memory 32 in the order of receipt of the wireless packets, as indicated by an arrow 15b2 in FIG. 15.

The reading of the Ethernet packets from the memory 32 is executed by the read DMAC 342 of the network controller 33 in FIG. 2. The transfer source address used by the read DMAC 342 may be set in the register 352 in FIG. 2 in accordance with the memory area from which the Ethernet packets are read.

The network controller 33 filters the read Ethernet packets with the filter F1, and stores the valid Ethernet packets extracted through the filtering process into the internal memory M1 in FIG. 2.

In FIG. 15, the image formation control device 20 is set in the regular operating state. Therefore, the network controller 33 stores the valid Ethernet packets from the internal memory M1 to the memory 22 of the image formation control device 20 with the data transfer function of the write DMAC 344 in FIG. 2, as indicated by arrows 15c1 and 15c2 in FIG. 15.

In FIG. 15, the arrow 15c1 represents the Ethernet packets received by the MAC 35, and the arrow 15c2 represents the converted Ethernet packets converted from the wireless packets received by the wireless module I/F 36. If the CPU 21 is capable of identifying the Ethernet packets received by the MAC 35 and the converted Ethernet packets converted from the wireless packets received by the wireless module I/F 36, the network controller 33 may store the two types of Ethernet packets in the memory 22 without distinction therebetween.

When the Ethernet packets are stored in the memory 22, the CPU 21 reads the Ethernet packets from the memory 22 and analyzes the contents of the read Ethernet packets. Based on the result of analysis, the CPU 21 generates the Ethernet packets for transmission and the wireless packets for transmission.

A subsequent process until the Ethernet packets for transmission generated by the CPU 21 are transmitted from the MAC 35 to the wired network is similar to that described above with FIG. 6. Further, a subsequent process until the wireless packets for transmission generated by the CPU 21 are transmitted from the wireless module I/F 36 to the wireless network is similar to that described above with FIG. 7.

In the example of FIG. 15, in which the image formation control device 20 is set in the regular operating state, the process of receiving multiple types of packets (e.g., the Ethernet packets and the converted Ethernet packets converted from the wireless packets) is executable with the single network controller 33.

If it is previously known, from the volume of packets received per time, that the network controller 34 is unnecessary, the network controller 34 may be removed from the network control device 30. Thereby, the cost of the network control device 30 is reduced. This cost reduction effect is enhanced particularly when the internal memory M2 in FIG. 2 has a high capacity.

Figure 16:
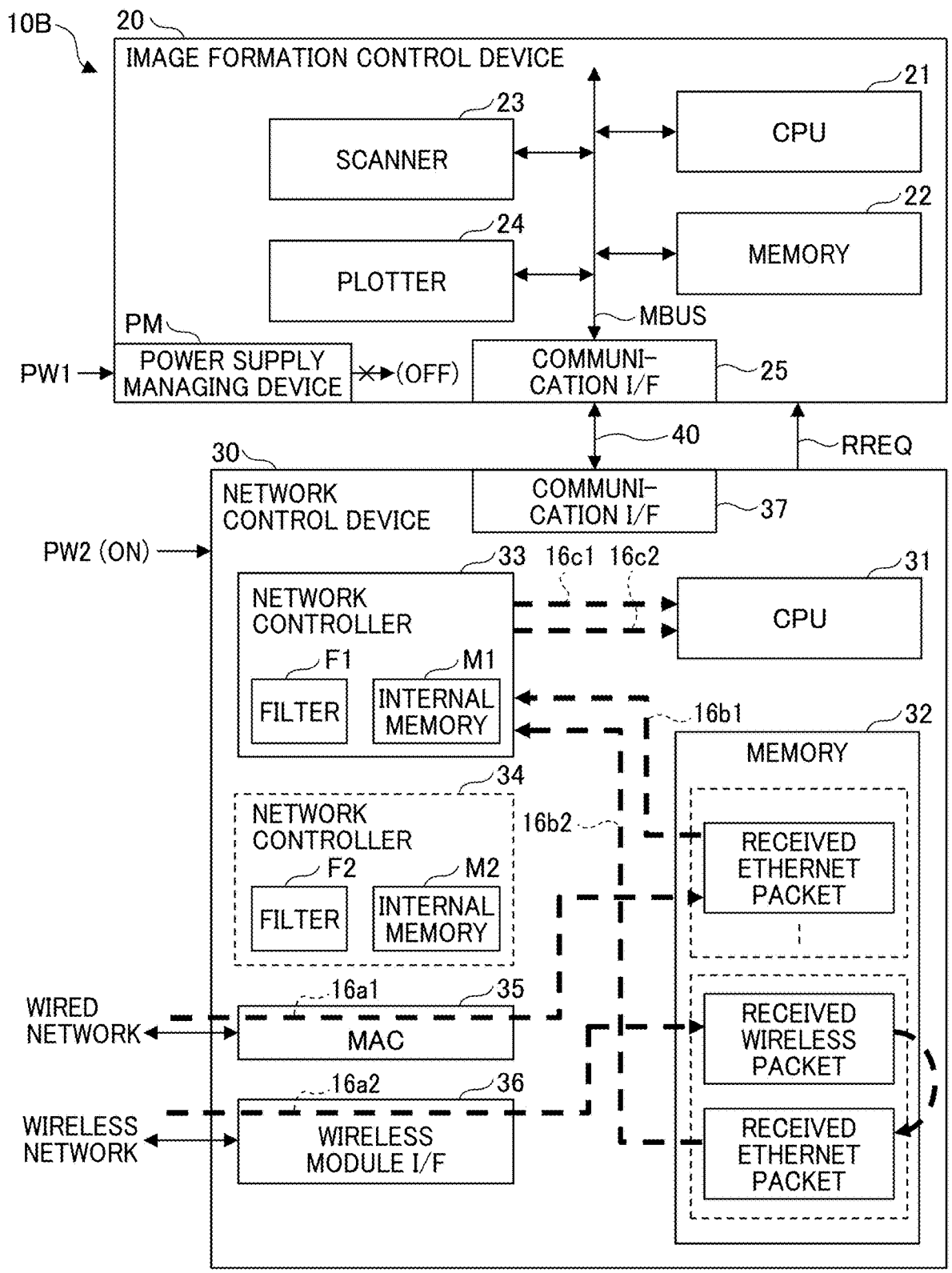
FIG. 16 is a diagram illustrating another example of the Ethernet packet reception process by the image forming apparatus of the third embodiment.

FIG. 16 is a diagram illustrating another example of the Ethernet packet reception process by the image forming apparatus 10B of the third embodiment in FIG. 15. Detailed description of parts of the process in FIG. 16 similar to those in FIGS. 4 and 15 will be omitted. In FIG. 16, the bus SBUS is omitted for clearer illustration. In FIG. 16, the image formation control device 20 is set in the energy saving state.

In FIG. 16, a process from the receipt of the Ethernet packets by the MAC 35 to the transfer of the Ethernet packets from the memory 32 to the network controller 33 is the same as that in FIG. 15, as indicated by arrows 16a1 and 16b1 in FIG. 16. Further, a process from the receipt of the wireless packets by the wireless module I/F 36 to the transfer of the converted Ethernet packets converted from the wireless packets from the memory 32 to the network controller 33 is the same as that in FIG. 15, as indicated by arrows 16a2 and 16b2 in FIG. 16.

In FIG. 16, the image formation control device 20 is set in the energy saving state. Therefore, the CPU 31 reads the valid Ethernet packets stored in the internal memory M1 of the network controller 33 in FIG. 2, as indicated by arrows 16c1 and 16c2 in FIG. 16.

In FIG. 16, the arrow 16c1 represents the Ethernet packets received by the MAC 35, and the arrow 16c2 represents the converted Ethernet packets converted from the wireless packets received by the wireless module I/F 36. If the CPU 31 is capable of identifying the Ethernet packets received by the MAC 35 and the converted Ethernet packets converted from the wireless packets received by the wireless module I/F 36, the CPU 31 may read the two types of Ethernet packets from the internal memory M1 without distinction therebetween.

The CPU 31 analyzes the contents of the Ethernet packets read from the internal memory M1, and generates the Ethernet packets for transmission and the wireless packets for transmission based on the result of analysis. A subsequent process until the Ethernet packets for transmission generated by the CPU 31 are transmitted from the MAC 35 to the wired network is similar to that described above with FIG. 4. Further, a subsequent process until the wireless packets for transmission generated by the CPU 31 are transmitted from the wireless module I/F 36 to the wireless network is similar to that described above with FIG. 5.

In the example of FIG. 16, in which the image formation control device 20 is set in the energy saving state, the process of receiving multiple types of packets (e.g., the Ethernet packets and the converted Ethernet packets converted from the wireless packets) is executable with the single network controller 33.

As described above, effects similar to those of the first embodiment are obtained in the third embodiment. For example, packets according to different communication systems are converted into the same type of packets to be filtered by the same type of filters. It is thereby possible to extract valid packets from the packets according to the different communication systems, and thus to reduce the number of packets to be subjected to the packet reception process. Consequently, the load on the CPU 31 or 21 is reduced, reducing the power consumption of the image forming apparatus 10B.

Further, in the third embodiment, the process of receiving multiple types of packets is executable with the single network controller 33. Further, if it is unnecessary to provide the network controller 34 in the network control device 30, the cost of the network control device 30 is reduced.

Figure 17:
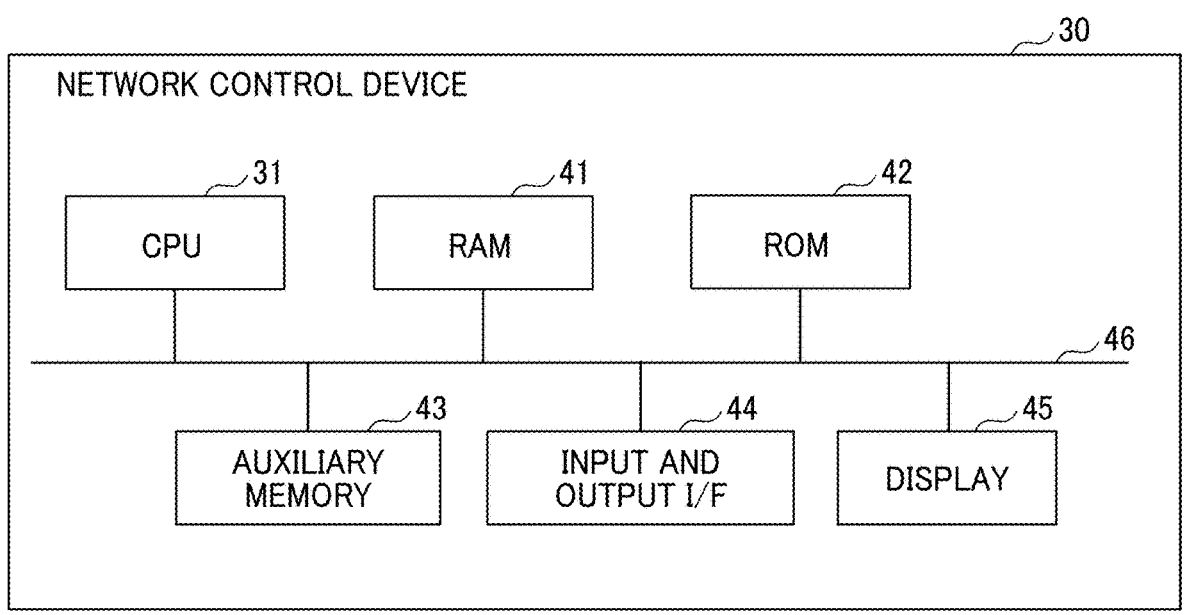
FIG. 17 is a block diagram illustrating an example of the hardware configuration of the network control device in each of the image forming apparatuses of the first to third embodiments.

FIG. 17 is a block diagram illustrating an example of the hardware configuration of the network control device 30 of the first to third embodiments illustrated in FIGS. 1, 13, and 15. The image formation control device 20 of the first to third embodiments in FIGS. 1, 13, and 15 may have a hardware configuration similar to that illustrated in FIG. 17.

The network control device 30 includes the CPU 31, a random access memory (RAM) 41, a read only memory (ROM) 42, an auxiliary memory 43, an input and output I/F 44, and a display 45, which are connected to each other via a bus 46. The bus 46 may be included in the bus SBUS illustrated in FIG. 1.

The CPU 31 in FIG. 17 is the same as the CPU 31 illustrated in FIGS. 1, 13, and 15. The CPU 31 executes the network control program stored in the ROM 42 or the auxiliary memory 43, thereby implementing the various functions described above.

The RAM 41 is used as a work area for the CPU 31. The RAM 41 may include the memory 32 illustrated in FIG. 1, for example. The ROM 42 stores various programs and parameters used in the various programs, for example. The network control program of an embodiment of the present invention may be stored in the ROM 42.

The auxiliary memory 43 is a memory such as a solid state drive (SSD) or a hard disk drive (HDD). The auxiliary memory 43 stores control programs such as an operating system (OS) for controlling the operation of the network control device 30 and various data and files for use in the operation of the network control device 30, for example.

The input and output I/F 44 includes user interfaces, such as a touch panel, a keyboard, operation buttons, and a speaker, and communication interfaces for communicating with other electronic devices or apparatuses. For example, the input and output I/F 44 may include the MAC 35 and the wireless module I/F 36 illustrated in FIG. 1.

The display 45 may display an operation window for operating the scanner 23 or the plotter 24 and the image of the document scanned by the scanner 23, for example. The touch panel of the input and output I/F 44 and the display 45 may be integrated together.

As described above, at least one of the above-described embodiments enables the received packets to be filtered regardless of the communication system of the packets, thereby reducing the power consumption.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. A network control device for processing a plurality of packets received from outside the network control device, the network control device being connected to an operation device that is settable in a regular operating state for supplying power to the operation device or an energy saving state for stopping power supply to at least a part of the operation device, the network control device comprising:
   a first communication interface configured to transmit and receive a first type of packets according to a first communication system;

a second communication interface configured to transmit and receive a second type of packets according to a second communication system different from the first communication system;

a first memory configured to store each of the first type of packets and the second type of packets at a specified address of the first memory;

a packet converter configured to convert the second type of packets stored in the first memory into the first type of packets and store the converted first type of packets in the first memory;

a first data transfer section configured to read each of the first type of packets from a specified address of the first memory;

a filter configured to extract a valid first type of packets from the first type of packets read by the first data transfer section; and a packet transmission controller configured to, when the operation device is in the energy saving state,
analyze contents of the valid first type of packets extracted by the filter,
when the contents of the extracted valid first type of packets are of the first type of packets received by the first communication interface, generate a first type of packets for transmission according to the first communication system, and transmit the generated first type of packets for transmission to the first communication interface, and
when the contents of the extracted valid first type of packets are of the second type of packets received by the second communication interface, generate a second type of packets for transmission according to the second communication system, and transmit the generated second type of packets for transmission to the second communication interface.

2. The network control device of claim 1, further comprising when the operation device is in the regular operating state:
a second data transfer section configured to transfer the valid first type of packets extracted by the filter to a second memory of the operation device; and
a third data transfer section configured to transfer the first type of packets for transmission or the second type of packets for transmission from the second memory to the first memory,
the first type of packets for transmission or the second type of packets for transmission being generated and stored in the second memory by the operation device in the regular operating state of the operation device based on analysis of contents of the valid first type of packets transferred to the second memory,
wherein when the first type of packets for transmission corresponding to the first type of packets received by the first communication interface are transferred to the first memory in the regular operating state of the operation device, the packet transmission controller transmits the first type of packets for transmission to the first communication interface, and
wherein when the second type of packets for transmission corresponding to the second type of packets received by the second communication interface are transferred to the first memory in the regular operating state of the operation device, the packet transmission controller transmits the second type of packets for transmission to the second communication interface.

3. The network control device of claim 2, further comprising a selector configured to supply the valid first type of packets extracted by the filter to the packet transmission controller in the energy saving state of the operation device, and
supply the valid first type of packets extracted by the filter to the second data transfer section in the regular operating state of the operation device.

4. The network control device of claim 3, further comprising a third memory configured to store the valid first type of packets extracted by the filter,
wherein the selector supplies the valid first type of packets from the third memory to the packet transmission controller in the energy saving state of the operation device, and
wherein the selector supplies the valid first type of packets from the third memory to the second data transfer section in the regular operating state of the operation device.

5. The network control device of claim 2, further comprising a plurality of network controllers each including the first data transfer section, the filter, the second data transfer section, and the third data transfer section,
wherein the plurality of network controllers alternately operate to supply the valid first type of packets extracted by the filter to the packet transmission controller or the operation device.

6. The network control device of claim 2, further comprising a plurality of network controllers each including the first data transfer section, the filter, the second data transfer section, and the third data transfer section,
wherein at least one of the plurality of network controllers operates in accordance with a volume of packets received by at least one of the first communication interface and the second communication interface.

7. The network control device of claim 1, wherein when the contents of the first type of packets analyzed in the energy saving state of the operation device represent a return instruction to bring the operation device back to the regular operating state from the energy saving state, the packet transmission controller issues an instruction to the operation device to return to the regular operating state.

8. An image forming apparatus comprising:
the network control device of claim 1 connected to the operation device; and
the operation device configured to perform a process of forming an image.

9. A control method of a network control device,
the network control device being connected to an operation device, and including a first communication interface, a second communication interface, and a first memory to process a plurality of packets received from outside the network control device, the operation device being settable in a regular operating state for supplying power to the operation device or an energy saving state for stopping power supply to at least a part of the operation device,
the control method comprising:
converting a second type of packets according to a second communication system each stored at a specified address of the first memory into a first type of packets according to a first communication system, and storing the converted first type of packets in the first memory;
reading each of the first type of packets from a specified address of the first memory;
extracting a valid first type of packets from the read first type of packets;

when the operation device is in the energy saving state, analyzing contents of the extracted valid first type of packets;

when the contents of the extracted valid first type of packets are of the first type of packets received by the first communication interface, generating a first type of packets for transmission according to the first communication system, and transmitting the generated first type of packets for transmission to the first communication interface; and when the contents of the extracted valid first type of packets are of the second type of packets received by the second communication interface, generating a second type of packets for transmission according to the second communication system, and transmitting the generated second type of packets for transmission to the second communication interface.

10. The control method of claim 9, further comprising when the operation device is in the regular operating state:

transferring the extracted valid first type of packets to a second memory of the operation device;

transferring the first type of packets for transmission or the second type of packets for transmission from the second memory to the first memory, the first type of packets for transmission or the second type of packets for transmission being generated and stored in the second memory by the operation device in the regular operating state of the operation device based on analysis of contents of the valid first type of packets transferred to the second memory;

when the transferring transfers to the first memory the first type of packets for transmission corresponding to the first type of packets received by the first communication interface, transmitting the first type of packets for transmission to the first communication interface; and when the transferring transfers to the first memory the second type of packets for transmission corresponding to the second type of packets received by the second communication interface, transmitting the second type of packets for transmission to the second communication interface.

11. The control method of claim 10, further comprising:
supplying the extracted valid first type of packets to the network control device in the energy saving state of the operation device, and
supplying the extracted valid first type of packets to the operation device in the regular operating state of the operation device.

12. The control method of claim 11, further comprising:
storing the extracted valid first type of packets in a third memory of the network control device,
wherein the supplying supplies the extracted valid first type of packets from the third memory to the network control device in the energy saving state of the operation device, and
wherein the supplying supplies the valid first type of packets from the third memory to the operation device in the regular operating state of the operation device.

13. The control method of claim 10, further comprising:
alternately operating a plurality of network controllers of the network control device to supply the extracted valid first type of packets to the network control device or the operation device.

14. The control method of claim 10, further comprising:
operating at least one of a plurality of network controllers of the network control device in accordance with a volume of packets received at at least one of the first communication interface and the second communication interface.

15. The control method of claim 9, further comprising:
when the contents of the first type of packets analyzed in the energy saving state of the operation device represent a return instruction to bring the operation device back to the regular operating state from the energy saving state, issuing an instruction to the operation device to return to the regular operating state.

16. A non-transitory recording medium storing a plurality of instructions which, when executed by one or more processors, cause the processors to perform a control method of a network control device, the network control device being connected to an operation device, and including a first communication interface, a second communication interface, and a first memory to process a plurality of packets received from outside the network control device, the operation device being settable in a regular operating state for supplying power to the operation device or an energy saving state for stopping power supply to at least a part of the operation device, the control method comprising:
converting a second type of packets according to a second communication system each stored at a specified address of the first memory into a first type of packets according to a first communication system, and storing the converted first type of packets in the first memory;

reading each of the first type of packets from a specified address of the first memory;

extracting a valid first type of packets from the read first type of packets;

when the operation device is in the energy saving state, analyzing contents of the extracted valid first type of packets;

when the contents of the extracted valid first type of packets are of the first type of packets received by the first communication interface, generating a first type of packets for transmission according to the first communication system, and transmitting the generated first type of packets for transmission to the first communication interface; and when the contents of the extracted valid first type of packets are of the second type of packets received by the second communication interface, generating a second type of packets for transmission according to the second communication system, and transmitting the generated second type of packets for transmission to the second communication interface.

* * * * *